(12) United States Patent
Lowenthal et al.

(10) Patent No.: US 9,526,148 B2
(45) Date of Patent: *Dec. 20, 2016

(54) ILLUMINATING DISPLAY SYSTEMS

(71) Applicant: NthDegree Technologies Worldwide Inc., Tempe, AZ (US)

(72) Inventors: Mark David Lowenthal, Gilbert, AZ (US); William Johnstone Ray, Fountain Hills, AZ (US); Peter Michael Bray, Naperville, IL (US); David R. Bowden, Lebanon, OH (US)

(73) Assignee: NthDegree Technologies Worldwide Inc, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/831,351

(22) Filed: Aug. 20, 2015

(65) Prior Publication Data

US 2015/0366033 A1 Dec. 17, 2015

Related U.S. Application Data

(63) Continuation of application No. 14/255,774, filed on Apr. 17, 2014, now Pat. No. 9,119,244, which is a
(Continued)

(51) Int. Cl.
*G09F 9/37* (2006.01)
*H05B 37/02* (2006.01)
(Continued)

(52) U.S. Cl.
CPC .......... *H05B 37/0209* (2013.01); *A47F 3/001* (2013.01); *G09F 13/00* (2013.01); *G09G 3/14* (2013.01);
(Continued)

(58) Field of Classification Search
CPC .................... H05B 33/089; H05B 33/0815
(Continued)

(56) References Cited

U.S. PATENT DOCUMENTS 4,020,389 A 4/1977 Dickson et al.
4,074,299 A 2/1978 Kusano et al.
(Continued)

FOREIGN PATENT DOCUMENTS

JP 07022177 A1 1/1995
JP 07073969 A1 3/1995
(Continued)

OTHER PUBLICATIONS

Hsi-Jen J. Yeh & John Smith, Fluidic Self-Assembly for the Integration of GaAs Light-Emitting Diodes on Si Substrates, IEEE Photonics Technology Letters, vol. 6, No. 6, Jun. 1994, pp. 706-708.
(Continued)

*Primary Examiner* — Thuy Vinh Tran
(74) *Attorney, Agent, or Firm* — Nancy R. Gamburd; Gamburd Law Group LLC

(57) ABSTRACT

An exemplary system comprises a power regulator and an emitting apparatus. The emitting apparatus is typically attached to or integrated with a display object, such as a merchandise package or container. A support structure, such as a point of purchase display, typically contains or supports one or more power regulators and display objects. The power regulator comprises a controller and a primary inductor, and the controller is adapted to provide a voltage or current to the primary inductor to generate a first primary inductor voltage. The emitting apparatus comprises an illumination source and a secondary inductor coupled to the illumination source. The illumination source is adapted to emit visible light when the power regulator is in an on state and when the secondary inductor is within a predetermined
(Continued)

distance of the primary inductor. In exemplary embodiments, the first and second inductors are substantially planar.

20 Claims, 11 Drawing Sheets

Related U.S. Application Data continuation of application No. 13/787,066, filed on Mar. 6, 2013, now Pat. No. 8,739,440, which is a continuation of application No. 13/347,632, filed on Jan. 10, 2012, now Pat. No. 8,413,359, which is a continuation of application No. 12/119,496, filed on May 13, 2008, now Pat. No. 8,127,477.

(51) Int. Cl.

| | | |
|---|---|---|
| G09G 3/14 | (2006.01) | |
| H05B 33/08 | (2006.01) | |
| H05B 41/24 | (2006.01) | |
| A47F 3/00 | (2006.01) | |
| G09F 13/00 | (2006.01) | |
| H01F 38/14 | (2006.01) | |
| H02J 5/00 | (2016.01) | |

(52) U.S. Cl.
CPC ...... *H05B 33/0815* (2013.01); *H05B 33/0839* (2013.01); *H05B 37/0227* (2013.01); *H05B 41/245* (2013.01); *G09G 2330/028* (2013.01); *H01F 38/14* (2013.01); *H02J 5/005* (2013.01)

(58) Field of Classification Search
USPC ........ 40/1, 446; 362/34, 382, 457, 559, 576, 362/806, 812; 312/324
See application file for complete search history.

(56) References Cited

U.S. PATENT DOCUMENTS

| | | | |
|---|---|---|---|
| 4,136,436 A | | 1/1979 | Kilby et al. |
| 4,152,624 A | | 5/1979 | Knaebel |
| 4,153,905 A | | 5/1979 | Charmakadze et al. |
| 4,316,208 A | | 2/1982 | Kobayashi et al. |
| 4,347,262 A | | 8/1982 | Marcus |
| 4,396,929 A | | 8/1983 | Ohki et al. |
| 4,407,320 A | | 10/1983 | Levine |
| 4,626,567 A | | 12/1986 | Chang |
| 4,638,110 A | | 1/1987 | Erbert |
| 4,755,485 A | | 7/1988 | Tsai |
| 4,761,720 A | | 8/1988 | Solow |
| 4,767,966 A | | 8/1988 | Simopoulos et al. |
| 4,919,506 A | | 4/1990 | Covey |
| 4,942,352 A | * | 7/1990 | Sano ........................ H01F 38/14 320/134 |
| 5,028,546 A | | 7/1991 | Hotchkiss |
| 5,113,232 A | | 5/1992 | Itoh et al. |
| 5,214,306 A | | 5/1993 | Hashimoto |
| 5,355,577 A | | 10/1994 | Cohn |
| 5,376,580 A | | 12/1994 | Kish et al. |
| 5,408,120 A | | 4/1995 | Manabe et al. |
| 5,469,020 A | | 11/1995 | Herrick |
| 5,507,404 A | | 4/1996 | Ryu |
| 5,545,291 A | | 8/1996 | Smith et al. |
| 5,583,394 A | | 12/1996 | Burbank et al. |
| 5,634,835 A | | 6/1997 | Wu et al. |
| 5,641,611 A | | 6/1997 | Shieh et al. |
| 5,756,147 A | | 5/1998 | Wu et al. |
| 5,786,664 A | | 7/1998 | Liu |
| 5,793,455 A | | 8/1998 | Nakamura |
| 5,904,545 A | | 5/1999 | Smith et al. |
| 5,932,327 A | | 8/1999 | Inoguchi et al. |
| 5,976,613 A | | 11/1999 | Janusauskas |
| 5,990,984 A | | 11/1999 | Meredith et al. |
| 6,046,543 A | | 4/2000 | Bulovic et al. |
| 6,066,513 A | | 5/2000 | Pogge et al. |
| 6,107,671 A | | 8/2000 | Onodera |
| 6,118,426 A | | 9/2000 | Albert et al. |
| 6,203,391 B1 | | 3/2001 | Murasko et al. |
| 6,274,508 B1 | | 8/2001 | Jacobsen et al. |
| 6,281,038 B1 | | 8/2001 | Jacobsen et al. |
| 6,291,266 B1 | | 9/2001 | Sayyah |
| 6,291,896 B1 | | 9/2001 | Smith |
| 6,312,304 B1 | | 11/2001 | Duthaler et al. |
| 6,316,278 B1 | | 11/2001 | Jacobsen et al. |
| 6,331,063 B1 | | 12/2001 | Kamada et al. |
| 6,339,013 B1 | | 1/2002 | Naseem et al. |
| 6,352,940 B1 | | 3/2002 | Seshan et al. |
| 6,380,729 B1 | | 4/2002 | Smith |
| 6,407,763 B1 | | 6/2002 | Yamaguchi et al. |
| 6,410,940 B1 | | 6/2002 | Jiang et al. |
| 6,417,025 B1 | | 7/2002 | Gengel |
| 6,420,266 B1 | | 7/2002 | Smith et al. |
| 6,424,088 B1 | | 7/2002 | Murasko et al. |
| 6,445,489 B1 | | 9/2002 | Jacobson et al. |
| 6,456,392 B1 | | 9/2002 | Asano |
| 6,465,969 B1 | | 10/2002 | Murasko et al. |
| 6,468,638 B2 | | 10/2002 | Jacobsen et al. |
| 6,479,395 B1 | | 11/2002 | Smith et al. |
| 6,479,930 B1 | | 11/2002 | Tanabe et al. |
| 6,507,989 B1 | | 1/2003 | Bowden et al. |
| 6,515,522 B2 | | 2/2003 | Inada et al. |
| 6,527,964 B1 | | 3/2003 | Smith et al. |
| 6,528,351 B1 | | 3/2003 | Nathan et al. |
| 6,555,408 B1 | | 4/2003 | Jacobsen et al. |
| 6,566,744 B2 | | 5/2003 | Gengel |
| 6,583,580 B2 | | 6/2003 | Shimoda et al. |
| 6,586,338 B2 | | 7/2003 | Smith et al. |
| 6,588,131 B2 | | 7/2003 | O'Connell, Jr. |
| 6,590,346 B1 | | 7/2003 | Hadley et al. |
| 6,599,769 B2 | | 7/2003 | Kondo et al. |
| 6,605,483 B2 | | 8/2003 | Victor et al. |
| 6,605,902 B2 | | 8/2003 | Shimoda et al. |
| 6,606,079 B1 | | 8/2003 | Smith |
| 6,606,247 B2 | | 8/2003 | Credelle et al. |
| 6,607,930 B2 | | 8/2003 | Karpov et al. |
| 6,611,002 B2 | | 8/2003 | Weeks et al. |
| 6,611,237 B2 | | 8/2003 | Smith |
| 6,623,579 B1 | | 9/2003 | Smith et al. |
| 6,624,569 B1 | | 9/2003 | Pennaz et al. |
| 6,624,571 B1 | | 9/2003 | Toyoyasu et al. |
| 6,635,306 B2 | | 10/2003 | Steckl et al. |
| 6,639,578 B1 | | 10/2003 | Comiskey et al. |
| 6,642,069 B2 | | 11/2003 | Armgarth et al. |
| 6,653,157 B2 | | 11/2003 | Kondo |
| 6,657,289 B1 | | 12/2003 | Craig et al. |
| 6,664,560 B2 | | 12/2003 | Emerson et al. |
| 6,665,044 B1 | | 12/2003 | Jacobsen et al. |
| 6,680,725 B1 | | 1/2004 | Jacobson |
| 6,683,333 B2 | | 1/2004 | Kazlas et al. |
| 6,683,663 B1 | | 1/2004 | Hadley et al. |
| 6,693,384 B1 | | 2/2004 | Vicentini et al. |
| 6,696,785 B2 | | 2/2004 | Shimoda et al. |
| 6,706,959 B2 | | 3/2004 | Hamakawa et al. |
| 6,715,901 B2 | | 4/2004 | Huang |
| 6,723,576 B2 | | 4/2004 | Nozawa et al. |
| 6,730,990 B2 | | 5/2004 | Kondo et al. |
| 6,731,353 B1 | | 5/2004 | Credelle et al. |
| 6,741,025 B2 | | 5/2004 | Tuck et al. |
| 6,777,884 B1 | | 8/2004 | Barnardo et al. |
| 6,780,696 B1 | | 8/2004 | Schatz |
| 6,788,541 B1 | | 9/2004 | Hsiung |
| 6,790,692 B2 | | 9/2004 | Onozawa |
| 6,794,221 B2 | | 9/2004 | Sayyah |
| 6,811,714 B1 | | 11/2004 | Gorrell et al. |
| 6,811,895 B2 | | 11/2004 | Murasko et al. |
| 6,816,380 B2 | | 11/2004 | Credelle et al. |
| 6,844,673 B1 | | 1/2005 | Bernkopf |
| 6,846,565 B2 | | 1/2005 | Korgel et al. |
| 6,850,312 B2 | | 2/2005 | Jacobsen et al. |
| 6,863,219 B1 | | 3/2005 | Jacobsen et al. |
| 6,864,435 B2 | | 3/2005 | Hermanns et al. |
| 6,864,570 B2 | | 3/2005 | Smith |

(56) References Cited

U.S. PATENT DOCUMENTS

| | | |
|---|---|---|
| 6,864,875 B2 | 3/2005 | Drzaic et al. |
| 6,871,982 B2 | 3/2005 | Holman et al. |
| 6,875,629 B2 | 4/2005 | Senda et al. |
| 6,876,357 B2 | 4/2005 | Kim |
| 6,878,638 B2 | 4/2005 | Regan et al. |
| 6,879,615 B2 | 4/2005 | Henrichs |
| 6,896,145 B2 | 5/2005 | Higgins et al. |
| 6,897,139 B2 | 5/2005 | Shibata et al. |
| 6,898,225 B2 | 5/2005 | Mooradian |
| 6,918,946 B2 | 7/2005 | Korgel et al. |
| 6,919,225 B2 | 7/2005 | Craig et al. |
| 6,919,641 B2 | 7/2005 | Onozawa et al. |
| 6,927,085 B2 | 8/2005 | Hadley et al. |
| 6,927,382 B2 | 8/2005 | King et al. |
| 6,930,020 B2 | 8/2005 | Sayyah |
| 6,936,193 B2 | 8/2005 | Saxe et al. |
| 6,946,322 B2 | 9/2005 | Brewer |
| 6,965,196 B2 | 11/2005 | Murasko et al. |
| 6,970,219 B1 | 11/2005 | Hermann |
| 6,972,970 B2 | 12/2005 | Yamada |
| 6,974,604 B2 | 12/2005 | Hunter et al. |
| 6,980,184 B1 | 12/2005 | Stewart et al. |
| 6,985,361 B2 | 1/2006 | Credelle et al. |
| 6,988,667 B2 | 1/2006 | Stewart et al. |
| 7,001,639 B2 | 2/2006 | Murasko et al. |
| 7,007,370 B2 | 3/2006 | Gracias et al. |
| 7,015,479 B2 | 3/2006 | Haas et al. |
| 7,018,575 B2 | 3/2006 | Brewer et al. |
| 7,030,412 B1 | 4/2006 | Drzaic et al. |
| 7,045,446 B2 | 5/2006 | Onozawa et al. |
| 7,046,328 B2 | 5/2006 | Jacobsen et al. |
| 7,061,556 B2 | 6/2006 | Sugihara et al. |
| 7,064,356 B2 | 6/2006 | Stefanov et al. |
| 7,070,851 B2 | 7/2006 | Jacobsen et al. |
| 7,071,629 B2 | 7/2006 | Russ et al. |
| 7,080,444 B1 | 7/2006 | Craig et al. |
| 7,091,939 B2 | 8/2006 | Kasai |
| 7,095,477 B2 | 8/2006 | Liang et al. |
| 7,101,502 B2 | 9/2006 | Smith et al. |
| 7,113,250 B2 | 9/2006 | Jacobsen et al. |
| 7,115,971 B2 | 10/2006 | Stumbo et al. |
| 7,133,431 B2 | 11/2006 | Onozawa et al. |
| 7,141,176 B1 | 11/2006 | Smith et al. |
| 7,172,789 B2 | 2/2007 | Smith et al. |
| 7,172,910 B2 | 2/2007 | Hadley et al. |
| 7,198,978 B2 | 4/2007 | Onozawa |
| 7,199,527 B2 | 4/2007 | Holman |
| 7,202,505 B2 | 4/2007 | Nurminen et al. |
| 7,214,569 B2 | 5/2007 | Swindlehurst et al. |
| 7,218,041 B2 | 5/2007 | Isoda |
| 7,218,048 B2 | 5/2007 | Choi et al. |
| 7,218,527 B1 | 5/2007 | Jacobsen |
| 7,223,635 B1 | 5/2007 | Brewer |
| 7,236,366 B2 | 6/2007 | Chen |
| 7,238,966 B2 | 7/2007 | Nakata |
| 7,244,326 B2 | 7/2007 | Craig et al. |
| 7,244,960 B2 | 7/2007 | Spreitzer et al. |
| 7,251,882 B2 | 8/2007 | Ricks et al. |
| 7,252,781 B2 | 8/2007 | Spreitzer et al. |
| 7,253,091 B2 | 8/2007 | Brewer et al. |
| 7,260,882 B2 | 8/2007 | Credelle et al. |
| 7,273,663 B2 | 9/2007 | Liao et al. |
| 7,288,432 B2 | 10/2007 | Jacobsen et al. |
| 7,321,159 B2 | 1/2008 | Schatz |
| 7,323,757 B2 | 1/2008 | Fonstad, Jr. et al. |
| 7,327,078 B2 | 2/2008 | Setlur et al. |
| 7,329,945 B2 | 2/2008 | Moden |
| 7,332,361 B2 | 2/2008 | Lu et al. |
| 7,351,660 B2 | 4/2008 | Brewer et al. |
| 7,353,598 B2 | 4/2008 | Craig et al. |
| 7,356,952 B2 | 4/2008 | Sweeney et al. |
| 7,381,591 B2 | 6/2008 | Moden |
| 7,382,363 B2 | 6/2008 | Albert et al. |
| 7,396,142 B2 | 7/2008 | Laizure, Jr. et al. |
| 7,417,306 B1 | 8/2008 | Jacobsen et al. |
| 7,425,467 B2 | 9/2008 | Jacobsen et al. |
| 7,452,748 B1 | 11/2008 | Craig et al. |
| 7,453,705 B2 | 11/2008 | Tolt |
| 7,489,248 B2 | 2/2009 | Gengel et al. |
| 7,491,969 B2 | 2/2009 | Wu et al. |
| 7,500,307 B2 | 3/2009 | Munn |
| 7,501,955 B2 | 3/2009 | Forster et al. |
| 7,510,672 B2 | 3/2009 | McCulloch et al. |
| 7,521,292 B2 | 4/2009 | Rogers et al. |
| 7,521,340 B2 | 4/2009 | Lemmi et al. |
| 7,531,218 B2 | 5/2009 | Smith et al. |
| 7,538,756 B2 | 5/2009 | Kerr et al. |
| 7,542,301 B1 | 6/2009 | Liong et al. |
| 7,551,454 B2 | 6/2009 | Wuchse et al. |
| 7,557,367 B2 | 7/2009 | Rogers et al. |
| 7,559,131 B2 | 7/2009 | Credelle et al. |
| 7,560,803 B2 | 7/2009 | Onozawa |
| 7,561,221 B2 | 7/2009 | Jacobsen et al. |
| 7,561,452 B2 | 7/2009 | Mednik et al. |
| 7,576,656 B2 | 8/2009 | Craig et al. |
| 7,595,588 B2 | 9/2009 | Gourlay |
| 7,605,799 B2 | 10/2009 | Amundson et al. |
| 7,607,812 B2 | 10/2009 | Kim |
| 7,615,479 B1 | 11/2009 | Craig et al. |
| 7,622,367 B1 | 11/2009 | Nuzzo et al. |
| 7,622,813 B2 | 11/2009 | Brewer |
| 7,623,034 B2 | 11/2009 | Ferguson et al. |
| 7,625,780 B2 | 12/2009 | Jacobs et al. |
| 7,629,026 B2 | 12/2009 | Sharma et al. |
| 7,645,177 B2 | 1/2010 | Kwasny |
| 7,662,008 B2 | 2/2010 | Hillis et al. |
| 7,687,277 B2 | 3/2010 | Sharma et al. |
| 7,698,800 B2 | 4/2010 | Watanabe |
| 7,704,763 B2 | 4/2010 | Fujii et al. |
| 7,716,160 B2 | 5/2010 | Smith et al. |
| 7,722,953 B2 | 5/2010 | Korgel et al. |
| 7,724,541 B2 | 5/2010 | Gracias et al. |
| 7,727,804 B2 | 6/2010 | Smith |
| RE41,563 E | 8/2010 | Caron et al. |
| 7,774,929 B2 | 8/2010 | Jacobs |
| 7,799,699 B2 | 9/2010 | Nuzzo et al. |
| 8,133,768 B2 | 3/2012 | Ray et al. |
| 2001/0003614 A1 | 6/2001 | Nagano et al. |
| 2001/0014520 A1 | 8/2001 | Usui et al. |
| 2001/0046652 A1 | 11/2001 | Ostler et al. |
| 2001/0048968 A1 | 12/2001 | Cox et al. |
| 2002/0001051 A1 | 1/2002 | Krusius et al. |
| 2002/0003233 A1 | 1/2002 | Mueller-Mach et al. |
| 2002/0005294 A1 | 1/2002 | Mayer et al. |
| 2002/0009274 A1 | 1/2002 | Gharavi |
| 2002/0027230 A1 | 3/2002 | Terada et al. |
| 2002/0130627 A1 | 9/2002 | Morgan et al. |
| 2002/0159488 A1 | 10/2002 | Wolak et al. |
| 2002/0190636 A1 | 12/2002 | Coghlan et al. |
| 2002/0195928 A1 | 12/2002 | Grace et al. |
| 2003/0080180 A1 | 5/2003 | Holley, Jr. et al. |
| 2003/0080341 A1 | 5/2003 | Sakano et al. |
| 2003/0090199 A1 | 5/2003 | Saita et al. |
| 2003/0113581 A1 | 6/2003 | Gotou |
| 2003/0160260 A1 | 8/2003 | Hirai et al. |
| 2003/0172563 A1 | 9/2003 | Higgins et al. |
| 2003/0222263 A1 | 12/2003 | Choi |
| 2004/0018379 A1 | 1/2004 | Kinlen |
| 2004/0051449 A1 | 3/2004 | Klausmann et al. |
| 2004/0099875 A1 | 5/2004 | Lin |
| 2004/0110279 A1 | 6/2004 | Everett |
| 2004/0113549 A1 | 6/2004 | Roberts et al. |
| 2004/0169813 A1 | 9/2004 | Liang et al. |
| 2004/0188672 A1 | 9/2004 | Spreitzer et al. |
| 2004/0190304 A1 | 9/2004 | Sugimoto et al. |
| 2004/0195576 A1 | 10/2004 | Watanabe et al. |
| 2004/0195967 A1 | 10/2004 | Padiyath et al. |
| 2004/0206939 A1 | 10/2004 | Spreitzer et al. |
| 2004/0218388 A1 | 11/2004 | Suzuki |
| 2004/0219730 A1 | 11/2004 | Basol |
| 2004/0227457 A1 | 11/2004 | Yamashita et al. |
| 2005/0020035 A1 | 1/2005 | Nause et al. |
| 2005/0029513 A1 | 2/2005 | Kawashima et al. |
| 2005/0067944 A1 | 3/2005 | Masuda et al. |

(56) References Cited

U.S. PATENT DOCUMENTS

| | | |
|---|---|---|
| 2005/0073849 A1 | 4/2005 | Rhoads et al. |
| 2005/0087131 A1 | 4/2005 | Shtein et al. |
| 2005/0146870 A1 | 7/2005 | Wu |
| 2005/0218421 A1 | 10/2005 | Andrews et al. |
| 2005/0230853 A1 | 10/2005 | Yoshikawa |
| 2005/0249901 A1 | 11/2005 | Yializis et al. |
| 2006/0001055 A1 | 1/2006 | Ueno et al. |
| 2006/0043390 A1 | 3/2006 | Nakata |
| 2006/0105481 A1 | 5/2006 | Boardman et al. |
| 2006/0113510 A1 | 6/2006 | Luo et al. |
| 2006/0119686 A1 | 6/2006 | Odell |
| 2006/0130894 A1 | 6/2006 | Gui et al. |
| 2006/0185715 A1 | 8/2006 | Hammerbacher et al. |
| 2006/0199313 A1 | 9/2006 | Harting et al. |
| 2006/0238666 A1 | 10/2006 | Ko et al. |
| 2006/0240218 A1 | 10/2006 | Parce |
| 2006/0277778 A1 | 12/2006 | Mick et al. |
| 2006/0281341 A1 | 12/2006 | Soeta |
| 2007/0022644 A1 | 2/2007 | Lynch et al. |
| 2007/0035808 A1 | 2/2007 | Amundson et al. |
| 2007/0040489 A1 | 2/2007 | Ray et al. |
| 2007/0042614 A1 | 2/2007 | Marmaropoulos et al. |
| 2007/0065646 A1 | 3/2007 | Chaimberg et al. |
| 2007/0090383 A1 | 4/2007 | Ota et al. |
| 2007/0090758 A1 | 4/2007 | Kwasny et al. |
| 2007/0108459 A1 | 5/2007 | Lu |
| 2007/0110921 A1 | 5/2007 | Angelopoulos et al. |
| 2007/0111354 A1 | 5/2007 | Seong et al. |
| 2007/0126544 A1 | 6/2007 | Wotherspoon et al. |
| 2007/0131925 A1 | 6/2007 | Shalk et al. |
| 2007/0138923 A1 | 6/2007 | Sokola |
| 2007/0152642 A1* | 7/2007 | Franklin .............. H05B 33/08 323/201 |
| 2007/0173578 A1 | 7/2007 | Spreitzer et al. |
| 2007/0188483 A1 | 8/2007 | Bonner |
| 2007/0289626 A1 | 12/2007 | Brabec et al. |
| 2008/0000122 A1 | 1/2008 | Shotton |
| 2008/0067475 A1 | 3/2008 | McCulloch et al. |
| 2008/0099772 A1 | 5/2008 | Shuy et al. |
| 2008/0111806 A1 | 5/2008 | Dyrc et al. |
| 2008/0121899 A1 | 5/2008 | Pires et al. |
| 2008/0135804 A1 | 6/2008 | Qiu et al. |
| 2008/0137333 A1 | 6/2008 | Tamaoki et al. |
| 2008/0160734 A1 | 7/2008 | Bertin et al. |
| 2008/0169753 A1 | 7/2008 | Skipor et al. |
| 2008/0191198 A1 | 8/2008 | Han et al. |
| 2008/0191220 A1 | 8/2008 | Daniels et al. |
| 2008/0199600 A1 | 8/2008 | Spreitzer et al. |
| 2008/0220288 A1 | 9/2008 | De Kok et al. |
| 2008/0223428 A1 | 9/2008 | Zeira |
| 2008/0237611 A1 | 10/2008 | Cok et al. |
| 2008/0248307 A1 | 10/2008 | Jurbergs et al. |
| 2008/0261341 A1 | 10/2008 | Zimmerman et al. |
| 2008/0265789 A1 | 10/2008 | Bertram et al. |
| 2008/0274574 A1 | 11/2008 | Yun |
| 2008/0289688 A1 | 11/2008 | Hammerbacher et al. |
| 2008/0297453 A1 | 12/2008 | Ray et al. |
| 2009/0014056 A1 | 1/2009 | Hockaday |
| 2009/0050921 A1 | 2/2009 | Bierhuizen et al. |
| 2009/0072245 A1 | 3/2009 | Noe et al. |
| 2009/0074649 A1 | 3/2009 | Korgel et al. |
| 2009/0140279 A1 | 6/2009 | Zimmerman et al. |
| 2009/0159907 A1 | 6/2009 | Wang |
| 2009/0168403 A1 | 7/2009 | Chang et al. |
| 2009/0217970 A1 | 9/2009 | Zimmerman et al. |
| 2009/0236616 A1 | 9/2009 | Ku |
| 2009/0242916 A1 | 10/2009 | Hsu et al. |
| 2009/0294786 A1 | 12/2009 | Jan et al. |
| 2009/0303715 A1 | 12/2009 | Takasago et al. |
| 2010/0060553 A1 | 3/2010 | Zimmerman et al. |
| 2010/0065862 A1 | 3/2010 | Ray et al. |
| 2010/0065863 A1 | 3/2010 | Ray et al. |
| 2010/0068838 A1 | 3/2010 | Ray et al. |
| 2010/0167441 A1 | 7/2010 | Ray et al. |
| 2010/0187482 A1 | 7/2010 | Mullen et al. |
| 2010/0247893 A1 | 9/2010 | Zimmerman |

FOREIGN PATENT DOCUMENTS

| | | |
|---|---|---|
| JP | 11292601 A | 10/1999 |
| JP | 2003203761 A | 7/2003 |
| JP | 2005174979 A1 | 6/2005 |
| WO | WO 99/39552 A1 | 8/1999 |
| WO | WO 99/67678 A1 | 12/1999 |
| WO | WO 00/72638 A1 | 11/2000 |
| WO | WO 01/16995 A1 | 3/2001 |

OTHER PUBLICATIONS

George M. Whitesides et al, Self-Assembly at All Scales, Science, vol. 295, Mar. 29, 2002, pp. 2418-2421.

Suk Tai Chang et al, Remotely powered self-propelling particles and micropumps based on miniature diodes, Nature Materials, vol. 6, Mar. 2007, pp. 235-240 and Supplementary Information pp. 1-7.

Sang-Il Park et al., Printed Assemblies of Inorganic Light-Emitting Diodes for Deformable and Semitransparent Displays, Science, vol. 325, Aug. 21, 2009, pp. 977-981, and Supporting Online Material, http://www.sciencemag.org/content/suppl/2009/08/20/325.5943.977.DC1, pp. 1-44.

Jong-Hyun Ahn, et al, Heterogeneous Three-Dimensional Electronics by Use of Printed Semiconductor Nanomaterials, Science, vol. 314, Dec. 15, 2006, pp. 1754-1757.

Paul Calvert, Inkjet Printing for Materials and Devices, Chem. Mater, vol. 13, Sep. 12, 2001, pp. 3299-3305.

Sean A. Stauth et al., Self-assembled single-crystal silicon circuits on plastic, PNAS, vol. 103, No. 38, Sep. 19, 2006, pp. 13922-13927.

David R. Allee et al, Circuit-Level Impact of a-Si:H Thin-Film-Transistor Degradation Effects, IEEE Transactions on Electron Devices, Jun. 2009, pp. 1166-1176, vol. 56.

D.L. Meier et al, Self-Doping Contacts & Associated Silicon Solar Cell Structures, Crystalline Silicon Solar Cells & Technologies, 2nd World Conference and Exhibition on Photovoltaic Solar Energy Conversion, Vienna, Austria, Jul. 6-10, 1998, pp. 1491-1494.

Zhijian Z. J. Lu et al., Wide-angle film diffuser, Journal of the Society for Information Display (SID), 15/8, 2007, pp. 565-569.

I. S. Tsai et al., Film surface morphology and field-emission characteristics of a carbon-nanotube array pattern fabricated under a magnetic field, Journal of the Society for Information Display (SID), 16/5, 2008, pp. 639-644.

Yiru Sun et al., Enhanced light out-coupling of organic light-emitting devices using embedded low-index grids, Nature Photonics, vol. 2, pp. 483-487, published online Jul. 11, 2008, http://www.nature.com/nphoton/journal/v2/n8/full/nphoton.2008.132.html.

H.W. Choi et al., Mechanism of enhanced light output efficiency in InGaN-based microlight emitting diodes, Journal of Applied Physics, vol. 93, No. 10, May 15, 2003, pp. 5978-5982.

Emmanuel Van Kerschaver et al., Back-contact Solar Cells: A Review, Prog.Photovolt: Res. Appl. 2006; 14:107-123.

Paul T. Fini et al., High-Efficiency Nitride-Based Solid State Lighting, Final Technical Progress Report, DoE Award No. DE-FC26-01NT41203, Jul. 30, 2005, pp. 1-132, http://www.osti.gov/bridge/servlets/purl/877537-2wWdpN/877537.pdf.

Z. Y. Fan et al., III-nitride micro-emitter arrays: development and applications, J. Phys. D: Appl. Phys. 41 (2008) 094001 (12 pp), pp. 1-12.

H. X. Jiang et al., Advances in III-Nitride Microstructures and Micro-Size Emitters, Journal of the Korean Physical Society, vol. 42, Feb. 2003, pp. S757-S764.

Breck Hitz, Q: What Did the Scientist Say to the LED? A: Don't Be Square, Photonics Technology News, Feb. 2008, pp. 27-29.

Christoph J. Brabec et al., Solution-Processed Organic Solar Cells, MRS Bulletin, vol. 33, Jul. 2008, pp. 670-675.

Yang Cao et al., A technique for controlling the alignment of silver nanowires with an electric field, Nanotechnology 17 (2006), pp. 2378-2380.

Saving Silicon, Nature Photonics, vol. 1, Oct. 2007, pp. 558-559.

(56) References Cited

OTHER PUBLICATIONS

D.R. McCamey et al., Spin Rabi flopping in the photocurrent of a polymer light-emitting diode, Nature Materials, vol. 7, Sep. 2008, pp. 723-728.

Xiang Zhang et al., Superlenses to overcome the diffraction limit, Nature Materials, vol. 7, Jun. 2008, pp. 435-441.

Aristeidis Karalis et al., Efficient wireless non-radiative mid-range energy transfer, Annals of Physics 323 (2008), pp. 34-48.

Vasily N. Astratov et al., Percolation of light through whispering gallery modes in 3D lattices of coupled microspheres, Optics Express, vol. 15, No. 25, Dec. 10, 2007, pp. 17351-17361.

M.L.M. Balistreri, Visualizing the whispering gallery modes in a cylindrical optical optical microcavity, Optics Letters, vol. 24, No. 24, Dec. 15, 1999, pp. 1829-1831.

Paul Paddon et al., Enabling Solar Cells, Laser+Photonics, vol. 4, 2008, pp. 42-45.

Peter Bermel et al., Improving thin-film crystalline silicon solar cell efficiencies with photonic crystals, Optics Express, vol. 15, No. 25, Dec. 10, 2007, pp. 16986-17000.

Vladimir S. Ilchenko et al., Dispersion compensation in whispering-gallery modes, J. Opt. Soc. Am. A, vol. 20, No. 1, Jan. 2003, pp. 157-162.

Makoto Gonokami, Expanding the potential of light and materials—Combining nanotechnology with optical technology, Japan Nanonet Bulletin, 60th Issue, Dec. 22, 2005, http://www.nanonet.go.jp/english/mailmag/pdf/060a.pdf, pp. 1-3.

Bahram Jalali, Teaching silicon new tricks, Nature Photonics, vol. 1, Apr. 2007, pp. 193-195.

Eli Yablonovitch, Light Emission in Photonic Crystal Micro-Cavities, in E. Burstein et al., Confined Electrons and Photons, Plenum Press, NY, 1995, pp. 635-646, http://www.ee.ucla.edu/labs/photon/bkchaps/ey1994cepnpa635646.pdf.

David H. Foster et al., Spatial and polarization structure in microdome resonators: effects of a Bragg mirror, in Alexis V. Kudryashov et al., Laser Resonators and Beam Control VII, Proceedings of SPIE 5333, pp. 195-203 (2004).

John Flintermann et al., Calculations on the Optical Properties of Layered Metal Nanospheres, Nanoscape, vol. 3, Issue 1, Spring 2006, pp. 29-37.

Juha-Pekka Laine, Design and Applications of Optical Microsphere Resonators, Helsinki University of Technology Publications in Engineering Physics, Espoo, Finland, Apr. 22, 2003, http://lib.tkk.fi/Diss/2003/isbn951226448X/isbn951226448X.pdf, pp. 1-56.

Cherry Yee Yee Cheng, Spherical Silicon Photovoltaics: Characterization and Novel Device Structure, University of Waterloo, 2008, pp. 1-102, http://proquest.umi.com/pqdlink?Ver=1&Exp=07-24-2016&FMT=7&DID=1633772641&RQT=309&attempt=1&cfc=1.

Aliaksandr Rahachou, Theoretical studies of light propagation in photonic and plasmonic devices, Linkoping Studies in Science and Technology, Doctoral Dissertation No. 1115, Aug. 2007, pp. 1-80, http://webstaff.itn.liu.se/~alira/ITN-Diss1115-Rahachou.pdf.

Hong Luo et al., Trapped whispering-gallery optical modes in white light-emitting diode lamps with remote phosphor, Applied Physics Letters 89, 2006, pp. 041125-1-041125-3.

L. Deych et al., Rayleigh Scattering of Whispering Gallery Modes of Microspheres due to a Single Scatter: Myths and Reality, Dec. 23, 2008, pp. 1-10, http://arxiv.org/PS_cache/arxiv/pdf/0812/0812.4404v1.pdf.

Wei-Chi Lee et al., Enhanced Performance of GaN-Based Vertical Light-Emitting Diodes with Circular Protrusions Surmounted by Hexagonal Cones and Indium-Zinc Oxide Current Spreading Layer, Applied Physics Express, vol. 4, 2011, pp. 072104-1-072104-3.

Leaner and Cheaper The rise of thin-film solar power, The Economist, Oct. 24, 2009, p. 76.

International Search Report and the Written Opinion of the International Searching Authority, PCT/US2011/50168, Mar. 14, 2012, pp. 1-11.

International Search Report and the Written Opinion of the International Searching Authority, PCT/US2011/50174, Mar. 16, 2012, pp. 1-11.

* cited by examiner

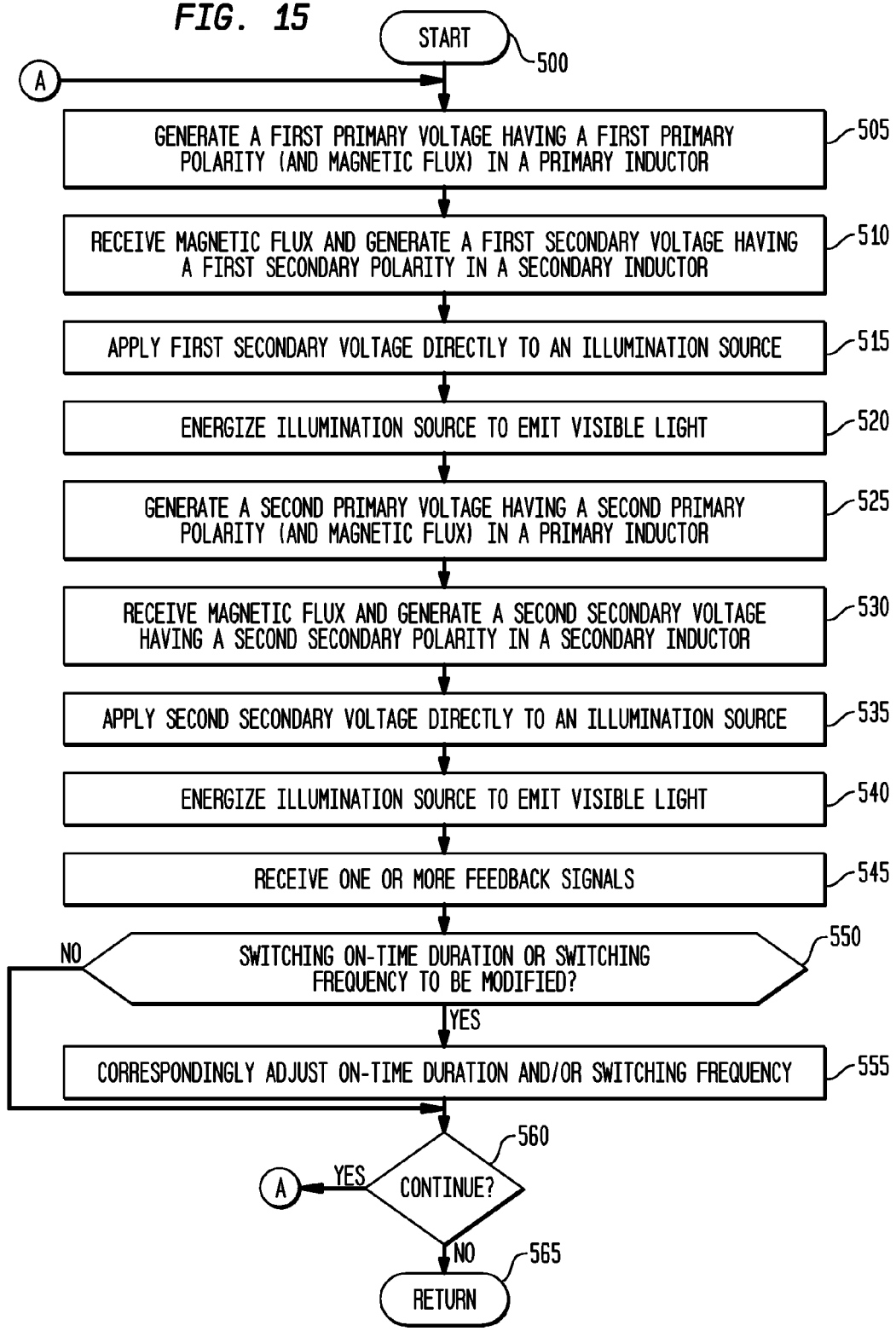

ILLUMINATING DISPLAY SYSTEMS

CROSS-REFERENCE TO RELATED APPLICATIONS

This application is a continuation of and claims priority to and the benefit of U.S. patent application Ser. No. 14/255,774, filed Apr. 17, 2014, and now U.S. Pat. No. 9,119,244 B2 issued Aug. 25, 2015, which is a continuation of and claims priority to and the benefit of U.S. patent application Ser. No. 13/787,066, filed Mar. 6, 2013 and now U.S. Pat. No. 8,739,440 B2 issued Jun. 3, 2014, inventors Mark D. Lowenthal et al., entitled "Illuminating Display Systems", which is a continuation of and claims priority to and the benefit of U.S. patent application Ser. No. 13/347,632, filed Jan. 10, 2012 and now U.S. Pat. No. 8,413,359 B2 issued Apr. 9, 2013, inventors Mark D. Lowenthal et al., entitled "Illuminating Display Systems", which is a continuation of and claims priority to and the benefit of U.S. patent application Ser. No. 12/119,496, filed May 13, 2008 and now U.S. Pat. No. 8,127,477 B2 issued Mar. 6, 2012, inventors Mark D. Lowenthal et al., entitled "Illuminating Display Systems", which are commonly assigned herewith, the entire contents of which are incorporated herein by reference with the same full force and effect as if set forth in their entirety herein, and with priority claimed for all commonly disclosed subject matter.

FIELD OF THE INVENTION

The present invention in general is related to illuminating objects for display, and more specifically is related to systems, apparatuses and methods for providing electrical power to self-illuminating objects for display.

BACKGROUND OF THE INVENTION

In a competitive product marketplace, it has become desirable to provide different methods of distinguishing one product from another, and making one product more attractive to users or consumers than another product. Entire fields of marketing, advertising, and graphic arts have, in many instances, been devoted to such marketing efforts.

One prior art display method has consisted of providing distinctive lighting to various products on display. For example, in Lynch et al. U.S. Patent Publication No. 2007/0022644, shelving units are designed to incorporate lighting mechanisms, which in turn provide distinctive lighting to the products displayed.

Attempts have been made to also provide for product packaging to provide its own illumination. For example, in the above-referenced publication, a package or container was provided incorporating an electroluminescent ("EL") panel. Providing alternating current ("AC") power to such a panel, however, is quite problematic. In U.S. Patent Publication No. 2007/0022644, electrical wires were provided from the EL panel (on the product) to a power source hidden from view. This is not a suitable solution, however, because the consumer or user cannot remove the product from the display without disconnecting the wires from the hidden power supply. In addition, this could be a hazardous process unsuitable for most commercial or practical applications, such as in a retail grocery store, with safety and liability concerns.

Other methods of providing illumination or other lighting to packaging has involved incorporating a power supply within the packaging, such as including a battery within the package to power light emitting diodes ("LEDs") provided on the package. This prior art method is also inadequate, as either switching would have to be provided on the package to turn the light source on or off, or the battery may become depleted before the merchandise has been removed from the point of purchase. This is also an expensive method, requiring separate electronics and a separate power source for each article to be sold. In addition, once removed from the point of purchase, the packaging may still be operable, which in some circumstances may raise a safety concern.

Yet other methods of providing power to objects has typically also involved incorporating a battery and lighting source (such as an LED) within a hand-held object, such as an electric toothbrush or electric razor, with the lighting source typically used to indicate that the battery is being charged when the hand-held object is secured in its charging base. These prior art devices include considerable electronics within the hand-held objects, including various rectifiers, capacitors, resistors, motors, and other power converters, which must be provided as discrete or integrated electronic components. These devices also utilize comparatively thick, solenoid-shaped inductors to transfer power between the base and the hand-held device. Again, this is also an expensive method, requiring separate electronics and a separate power source for each object.

Accordingly, a need remains to provide a system for self-illuminating display objects. Such a system should provide power to the display object without requiring an electrical connection to a separate power supply. In addition, such a system should be able to receive energy to power its illumination source without requiring the incorporation of switching and driving electronics and power sources within the display object, such as within the packaging for a consumer product. The display objects having the illumination source should be capable of manufacturing at low cost, such as through a printing process, including manufactured as part of the packaging or container of the incorporated contents. Lastly, such as system should provide for the illumination source to be sealed or self-contained, without external connections required, and further, to be inert when removed from the point of purchase display or other support.

SUMMARY OF THE INVENTION

The exemplary embodiments of the present invention provide a system, method, and apparatuses for self-illuminating display objects. The exemplary system, method, and apparatuses provide power to the display object without requiring an electrical connection to a separate power supply. The exemplary system, method, and apparatuses provide energy to power an illumination source without requiring the incorporation of switching and driving electronics and power sources within the display object, such as within the packaging for a consumer product. The display objects having the illumination source are capable of being manufactured at low cost, such as through a printing process, including manufactured as part of the packaging or container of the incorporated contents. The exemplary system, method, and apparatuses also provide for the illumination source to be sealed or self-contained, without external connections required, and further, to be inert when removed from the point of purchase display or other support.

Another significant feature of an exemplary embodiment of the emitting apparatus is that it consists of passive electronic elements and devices, and may be provided in a completely sealed form. This has significant benefits for use in packaging provided to consumers, such as for safety and control concerns, and is discussed in greater detail below.

Another significant feature of an exemplary embodiment of the inventive emitting apparatus is that it may be either disposable or reusable. For example, the emitting apparatus may be included within various types of packaging, which may then be disposed of by the user when the incorporated or included product has been consumed.

An exemplary system for illuminating a display object comprises a power regulator and an emitting apparatus. The power regulator comprises a controller and a primary inductor coupled to the controller, with the controller adapted to provide a voltage or current to the primary inductor to generate a first primary inductor voltage. The emitting apparatus is magnetically or otherwise removably couplable to the power regulator, with the emitting apparatus comprising an illumination source and a secondary inductor. In selected embodiments, the secondary inductor is directly coupled to the illumination source.

In exemplary embodiments, the secondary inductor and at least a portion of the illumination source may comprise a cured conductive ink or polymer, and also may be incorporated within a merchandise package. Depending on the contents, the merchandise package may have a spacer structure between the secondary inductor and a space or location for holding merchandise. An exemplary embodiment may also provide that the secondary inductor and the at least a portion of the illumination source are incorporated within an adhesive label or package label.

The exemplary illumination source is adapted to emit visible light when the power regulator is in an on state and when the secondary inductor is within a predetermined distance of the primary inductor, and may be electronically inert when not within the predetermined distance of the primary inductor.

The exemplary secondary inductor is adapted to receive a magnetic flux from the primary inductor and generate a first secondary inductor voltage. Typically, the first primary inductor voltage has a first polarity, and the controller is further adapted to provide the voltage or current to the primary inductor to generate a second primary inductor voltage having a second polarity opposite the first polarity. The power regulator may have any configuration of a plurality of configurations, including a flyback configuration, for example.

In selected exemplary embodiments, the illumination source comprises an electroluminescent panel or display. An exemplary electroluminescent panel or display typically comprises: a first conductor coupled to the secondary inductor; a dielectric layer; an emissive layer comprising a plurality of phosphor particles suspended in a cured polymer; and a second, optically transmissive conductor coupled to the emissive layer and to the secondary inductor. In an exemplary embodiment, it may also comprise at least one color layer, which in turn may further comprise a plurality of fluorescent inks or dyes. An exemplary method of manufacturing this exemplary emitting apparatus comprises: printing the secondary inductor and the first conductor using a conductive ink or polymer; printing the dielectric layer; printing the emissive layer; and printing the second, optically transmissive conductor. More generally, an exemplary method of manufacturing the emitting apparatus comprises printing the secondary inductor and at least a portion of the illumination source using a conductive ink or polymer.

In other selected exemplary embodiments, the illumination source comprises: at least one light emitting diode; and at least one blocking diode coupled to the at least one light emitting diode and further coupled to the secondary inductor.

In selected exemplary embodiments, the emitting apparatus does not include any additional active electronic components or any battery. In addition, the emitting apparatus may be substantially sealed. An exemplary method of manufacturing the emitting apparatus comprises printing the secondary inductor and at least a portion of the illumination source using a conductive ink or polymer.

An exemplary system is a merchandise display system, which further comprises a support structure adapted to support the power regulator within a predetermined proximity to at least one display object, with the display object having the emitting apparatus and incorporated merchandise. The power regulator may be disposed along or within a horizontal member of the support structure, or disposed along or within a rear, vertical member of the support structure. In another exemplary embodiment, the power regulator is portable and disposed to be positioned on top of a horizontal surface of a support structure. An exemplary power regulator is couplable to an AC or DC power source, separately or through a support structure, and the DC power source may be provided through an Ethernet connection, for example.

In selected exemplary embodiments, the secondary inductor is substantially planar. Also in selected exemplary embodiments, the primary inductor is substantially planar.

Another exemplary embodiment provides an illumination system comprising: a support structure adapted to support a display object; a power regulator coupled to the support structure, the power regulator comprising a controller and a primary inductor coupled to the controller, the controller adapted to provide a voltage or current to the primary inductor to generate a first primary inductor voltage; and an emitting apparatus coupled to the display object, the emitting apparatus comprising an illumination source and a secondary inductor coupled to the illumination source, the illumination source adapted to emit visible light when the secondary inductor is within a predetermined distance of the primary inductor when the power regulator is in an on-state.

The secondary inductor may comprise a cured conductive ink or polymer and has a substantially planar or flat form factor, and the primary inductor may also have a substantially planar or flat form factor. In addition, the secondary inductor may be directly coupled to the illumination source.

In selected exemplary embodiments, the display object comprises a package and package contents, and wherein the emitting apparatus is integrally formed with, or printed on, or adhesively attached to the package of the display object. In other selected exemplary embodiments, the display object comprises a container and liquid contents, and wherein the emitting apparatus is integrally formed with, or printed on, or adhesively attached to the container of the display object.

Another exemplary display system for illuminating merchandise comprises: a support structure adapted to support a display object; a power regulator comprising a controller and a substantially planar primary inductor coupled to the controller; and an emitting apparatus coupled to the display object, the emitting apparatus comprising an electroluminescent illumination source and a substantially planar secondary inductor coupled to the electroluminescent illumination source.

Another exemplary illumination system comprises: a support structure adapted to support a plurality of display objects; one or more power regulator coupled to the support structure, a power regulator comprising one or more controllers and one or more primary inductors coupled to the one or more controller, each controller adapted to provide a voltage or current to a selected primary inductor to generate a first primary inductor voltage; and a plurality of emitting apparatuses, a corresponding emitting apparatus of the plurality of emitting apparatuses coupled to a corresponding display object of the plurality of display objects, each emitting apparatus comprising an illumination source and a secondary inductor coupled to the illumination source, each illumination source adapted to emit visible light when the coupled secondary inductor is within a predetermined distance of a corresponding primary inductor when the power regulator is in an on-state.

An exemplary method of illuminating a display object is also provided, with an illumination source coupled to or integrated with the display object. The exemplary method comprises: energizing a primary inductor to provide a first primary voltage; receiving a magnetic flux from the primary inductor and generating a first secondary voltage in a planar secondary inductor; applying the first secondary voltage to the illumination source; and energizing the illumination source to emit visible light.

The exemplary method may further comprise: energizing the primary inductor to provide a second primary voltage having a polarity opposite a first primary voltage polarity; receiving a magnetic flux from the primary inductor and generating a second secondary voltage in a planar secondary inductor, the second secondary voltage having a polarity opposite a first secondary voltage polarity; applying the second secondary voltage to the illumination source; and energizing the illumination source to emit visible light. The exemplary method may also comprise detecting a presence of a display object; detecting when display object is no longer within a predetermined distance of the primary inductor; detecting a pulse duration of a voltage across the primary inductor and adjusting the first primary voltage; and or adjusting a brightness of an illumination source by adjusting the first primary voltage.

An exemplary emitting apparatus for illuminating a display object is provided, with the apparatus magnetically couplable to a power regulator having a primary inductor to generate a primary inductor voltage. The exemplary apparatus comprises: an illumination source; and a secondary inductor directly coupled to the illumination source.

Another exemplary emitting apparatus for illuminating a display object comprises: a secondary inductor; and an illumination source directly coupled to the secondary inductor, the illumination source adapted to emit visible light when the secondary inductor is within a predetermined distance of the primary inductor when the power regulator is in an on-state.

Another exemplary emitting apparatus comprises: an electroluminescent illumination source; and a substantially planar secondary inductor coupled to the illumination source. Yet Another exemplary emitting apparatus comprises: a substantially planar secondary inductor; and an illumination source directly coupled to the secondary inductor, the illumination source adapted to emit visible light when the secondary inductor is within a predetermined distance of the primary inductor when the power regulator is in an on-state.

An exemplary power regulator apparatus for providing power for illumination of a display object is also disclosed. The exemplary apparatus is magnetically couplable to an emitting apparatus having a secondary inductor and an illumination source. The exemplary apparatus comprises: a substantially planar, primary inductor; and a controller coupled to the primary inductor, the controller adapted to provide a voltage or current to the primary inductor to generate a first primary inductor voltage for the illumination source to emit visible light when the secondary inductor is within a predetermined distance of the primary inductor. The exemplary apparatus may be adapted to be supported by a support structure within a predetermined proximity to at least one display object, the display object having the emitting apparatus and incorporated merchandise.

In selected embodiments, the exemplary apparatus may further comprise a feedback circuit coupled to the controller, the feedback circuit comprising a second, feedback secondary inductor coupled to a series resistance and capacitance. The series resistance and capacitance may have respective resistance and capacitance values which are substantially similar to or substantially correspond to an illumination source series resistance and capacitance. The controller may be further adapted to determine a pulse duration of a voltage or current of the feedback circuit, to modify an energizing of the primary inductor in response to the determined pulse duration. In other selected embodiments, the controller may be further adapted to modify an energizing of the primary inductor in response to a feedback signal from the feedback circuit, or to modify a pulse duration or frequency of energizing of the primary inductor in response to a feedback signal from the feedback circuit. The controller also may be further adapted to modify an energizing of the primary inductor to control output brightness of the illumination source.

In selected embodiments, the controller further comprises a plurality of switches or transistors coupled to the primary inductor. The controller may be further adapted to determine a pulse duration of an induced voltage or current, and to modify an on-time duration or a switching frequency of the plurality of switches or transistors.

The apparatus may further comprise, a memory coupled to the controller, with the memory adapted to store a predetermined value for a pulse duration of an induced voltage or current. The induced voltage or current may be in the primary inductor or a second, feedback secondary inductor. In selected embodiments, the controller is further adapted to determine the pulse duration of the induced voltage or current, to compare the determined pulse duration to the predetermined value, and using a comparison result, to determine a presence or an absence of the emitting apparatus. In other selected exemplary embodiments, the memory is adapted to store values for switching frequency or switch on time durations or pulse widths, and the values may be provided in the form of a look up table (LUT). The memory may also be integrated or otherwise included within the controller.

Another exemplary apparatus for providing power for illumination of a display object comprises: a primary inductor having a substantially planar form; a memory adapted to store values for switching frequency or switch on-time durations or pulse widths; and a controller comprising control logic block and a plurality of switches, the control logic block coupled to the memory and to the plurality of switches, the plurality of switches coupled to the primary inductor, the controller adapted to switch a voltage or current to the primary inductor to generate a first primary inductor voltage for the illumination source to emit visible light when the secondary inductor is within a predetermined distance of the primary inductor.

Lastly, another exemplary apparatus is disclosed for providing power for illumination of a plurality of display objects, with each display object having an emitting apparatus, and with each emitting apparatus having a secondary inductor and an illumination source. The exemplary apparatus comprises: a plurality of substantially planar, primary inductors; and a controller coupled to the plurality of primary inductors, the controller adapted to provide a voltage or current to each primary inductor to generate a corresponding first primary inductor voltage for a corresponding illumination source to emit visible light when the corresponding secondary inductor is within a predetermined distance of the corresponding primary inductor.

Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which:

FIGS. 12A and 12B, is a diagram illustrating an exemplary first timing scheme in accordance with the teachings of the present invention.

FIGS. 14A, 14B, 14C, and 14D is a diagram illustrating an exemplary second timing scheme in accordance with the teachings of the present invention.

FIG. 15 is a flow chart illustrating an exemplary method in accordance with the teachings of the present invention.

DETAILED DESCRIPTION OF EXEMPLARY EMBODIMENTS

Figure 1:
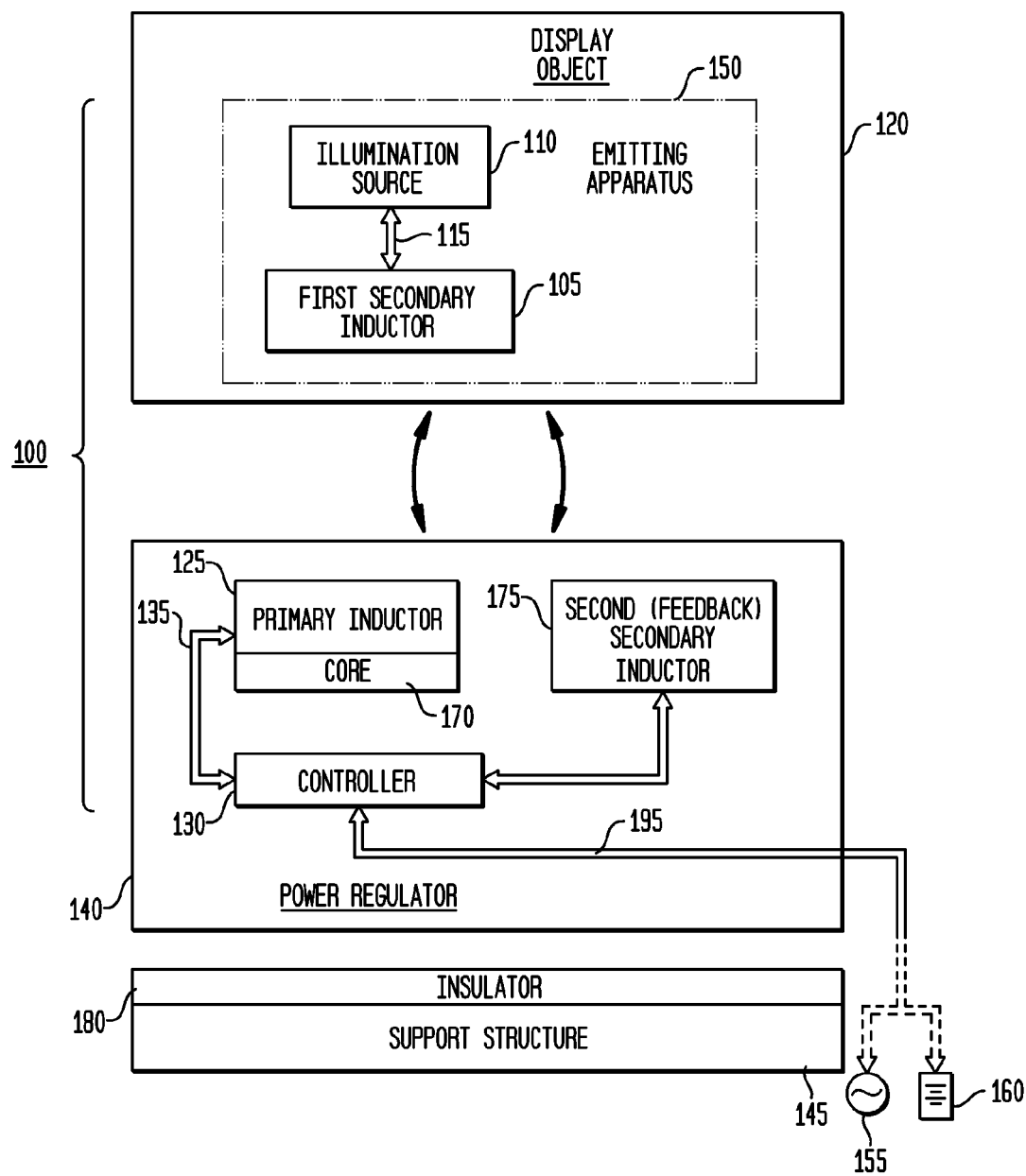
FIG. 1 is a block diagram illustrating an exemplary first system in accordance with the teachings of the present invention.

While the present invention is susceptible of embodiment in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

FIG. 1 is a block diagram illustrating an exemplary first system 100 in accordance with the teachings of the present invention. The system 100 comprises a (first) power regulator 140 and a (first) emitting apparatus 150 (the latter being typically attached to, incorporated with or otherwise included with the display object 120). The system 100 is typically associated with a support structure 145, such as a shelf, a table, a rack, a hanger, or any other structure suitable for holding any type of object, typically in a stationary position. For example, the support structure 145 may be a merchandise display shelving unit in a retail store, a bar table in a pub, a table in a consumer's kitchen, a refrigeration or freezer rack in a retail store, a signage holder in a window, etc. The system 100 is also associated with some external power source, such as an AC power source 155, e.g., from a line voltage (AC main) provided by an electrical utility company, or such as a DC power source 160, e.g., from a battery, an AC-DC converter, a network, or other sources, including power over Ethernet. The power may be provided over a physical connection, such as one or more cables or wires 195, or may be provided wirelessly, such as via RF or microwave power, or through another type of connector (e.g., connector 185 in FIG. 5). Various insulator(s) 180 or other dielectrics may also be utilized, such as to provide electrical shielding, for example.

The display object 120 may be virtually any object of any kind, shape, or material, and in any context, such as a retail establishment or a user's home, without limitation. For example, the display object 120 may be packaging used for the sale of products at a point of purchase display at a retail store, may be a container used to hold a consumable item such as a liquid, may be a form of signage, may be an article of clothing, etc. Coupled to or integrated with the display object 120 is the emitting apparatus 150, which comprises an illumination source 110 electrically coupled to a (first) secondary inductor (or secondary winding) 105, such as through an electrical connection (e.g., wires) 115. The illumination source 110 may be any of innumerable light emitting devices, without limitation, and is solely required to emit at least some light in the visible spectrum in response to a voltage, such as an electroluminescent ("EL") display or panel, a phosphor-based EL display (illustrated in FIG. 8), a solid state electronic display, such as a plurality of light emitting diodes ("LEDs"), etc.

In an exemplary embodiment, the emitting apparatus 150 is formed in whole or in part by a printing or laminating process, and may be formed integrally with the display object 120, such as printed directly on or molded within the display object 120 (which is then a substrate 205, discussed below with reference to FIG. 8), or created separately from the display object 120, such as printed or laminated on an adhesive label, which is then affixed to the display object 120. In another exemplary embodiment, part or all of the emitting apparatus 150 may be formed separately, such as on a printed circuit board or an adhesive label, such as when the illumination source 110 may be comprised of a plurality of discrete, solid state emitters (e.g., LEDs), and then attached to the display object 120. In yet another exemplary embodiment, the illumination source 110 is formed in whole or in part by a printing or laminating process, and may be formed integrally with the display object 120, and the secondary inductor 105 (formed separately) is coupled to the illumination source 110, such as through a conductive glue and/or lamination. Numerous variations will be apparent to those having skill in the manufacturing and display arts, and all such variations are considered equivalent and within the scope of the present invention.

The power regulator 140 comprises a controller 130 coupled (connection 135, such as a wire or printed conductor or conductive glue) to a primary inductor (or primary winding) 125. The power regulator 140 may include, as options, an inductor (or transformer) core 170, and/or a second, feedback secondary inductor (or winding) 175.

As an oversimplified explanation, the controller 130 provides energy to the primary inductor 125, typically in the form of an electrical voltage or an electrical current, creating a magnetic flux in the primary inductor 125. The magnetic flux is also available to the secondary inductor 105, which in turn then provides energy to the illumination source 110, also typically in the form of an electrical voltage or an electrical current.

In exemplary embodiments, the display object 120 is separable and removable from the power regulator 140. When in sufficient proximity to the power regulator 140, the illumination source 110 of the display object 120 emits light, typically in the visible and ultraviolet spectra. Conversely, when the display object 120 is no longer in sufficient proximity to the power regulator 140, such that the secondary inductor 105 is not or is no longer receiving a sufficient magnetic flux from the primary inductor 125, the illumination source 110 is insufficiently energized and no longer emits light. It is anticipated that the proximity range for providing energy to the secondary inductor 105 is on the order of 0-10 cm from the secondary inductor 105, depending upon their corresponding inductor sizes and current-carrying capacities, for example and without limitation. In an exemplary embodiment, the operational distance is on the order of 0-10 mm.

A significant feature of an exemplary embodiment of the emitting apparatus 150 is that it consists of passive electronic elements and devices, as described above, and may be provided in a completely sealed form for protection against environmental conditions, such as moisture, humidity, etc. This has significant benefits for use in packaging provided to consumers, such as for safety and control concerns. Because no power is available to the emitting apparatus 150 when it is no longer in close proximity to the primary inductor 125, the emitting apparatus 150 is then functionally and electrically inert and may be mishandled, destroyed, or disposed of, without the potential for causing an electrical shock to the user handling the emitting apparatus 150. This use of passive and sealable components in the emitting apparatus 150 is particularly advantageous when utilized in conjunction with consumer products, such as toys, cereal boxes, and other display objects 120 which may be handled by small children.

Also quite new and novel for the system 100 is that either or both the primary inductor 125 (of the power regulator 140) and the secondary inductor 105 (of the emitting apparatus 150) are provided as substantially flat, planar inductors in an exemplary embodiment (e.g., as illustrated for the secondary inductor 105A in FIG. 10, discussed below). This is especially significant for the secondary inductor 105 which, for example, may be printed on the packaging of the display object 120, such as a cardboard carton, so that a substantially planar (flat form factor) may be in the same plane as a side, bottom, or top of the carton, for example. That the primary inductor 125 and the secondary inductor 105 are substantially planar, having substantially flat form factors, is also significant for optimizing the coupling of magnetic flux between them. For example, in exemplary embodiments, the primary inductor 125 and the secondary inductor 105 may be abutting, one planar secondary inductor 105 on top of or next to the planar primary inductor 125. The substantially planar, flat form factor has the additional benefit of allowing for a degree of offset between the primary inductor 125 and the secondary inductor 105, and nonetheless enabling a coupling of the magnetic flux, albeit less than if perfectly aligned. This is in sharp contrast with prior art devices, such as rechargeable hand-held devices discussed above, which have inductors which are not planar, do not have flat form factors, and instead have considerably more solenoid-shaped forms which are comparatively much thicker, including mating inductors in which one inductor is seated inside the inner core of the other.

Another significant feature of an exemplary embodiment of the emitting apparatus 150 is that it may be either disposable or reusable. For example, the emitting apparatus 150 may be included within various types of packaging (as display object(s) 120), which may then be disposed of by the user when the incorporated or included product has been consumed. Also for example, the emitting apparatus 150 may be included within a reusable display object 120, such as a cup or drinking glass, such as the system 100C illustrated in FIGS. 6 and 7.

This is a stark contrast with prior art devices and systems. As indicated above, prior art systems which may have a self-illuminating object may require a physical, hard-wired connection between the display object and a power source, which the consumer must disconnect to purchase or enjoy the object. In other cases, active electronic devices must be included within the display object, such as batteries and transistors or other switches. In both cases, the display object is not electrically or otherwise inert when removed from the display system.

The primary inductor 125 and the secondary inductor 105 collectively may be considered to form a transformer having an air gap between them, along with other intervening materials, such as packaging, insulators such as plastic, and so on. The air gap may be quite small, such as when the primary inductor 125 and secondary inductor 105 are placed in close proximity to each other, such as abutting, and in other instances, the air gap may be larger, such as when the primary inductor 125 and the secondary inductor 105 are spaced apart or offset from each other. The air gap and other intervening materials also may be considered to provide a means for energy storage between the two inductors.

In addition, the secondary inductor 105 is separable and removable from the primary inductor 125. In selected embodiments, the secondary inductor 105 is incorporated directly into packaging such as a cardboard carton, for example, and is in fact designed to be disposable.

Also significant, no intervening active electronic components are required between the secondary inductor 105 and the illumination source 110, also in stark contrast with the prior art. Indeed, in many of the exemplary embodiments, there are no additional electronic components whatsoever between the secondary inductor 105 and the illumination source 110, which are directly coupled, such as through a printed conductor which also is used to form the secondary inductor 105. In other exemplary embodiments, such as to implement different operational modes such as regional or pixel addressability (without including additional secondary inductors 105 and corresponding primary inductors 125), switching components may also be included (between the secondary inductor 105 and the illumination source 110) to separately or independently control the energizing of a selected region of the illumination source 110. (In the latter case, the secondary inductor 105 and the illumination source 110 are not directly coupled, but are indirectly coupled through intervening components.) In other exemplary embodiments, additional components may be included, such as inductors, capacitors, and resistors, coupled to the illumination source 110, to create circuits which can be tuned to provide a voltage to the illumination source 110 based on a selected drive frequency. This latter RLC circuitry, for example, can be used to separately or independently drive a selected illumination source 110 of a plurality of illumination sources 110, using its corresponding drive frequency.

Figure 2:
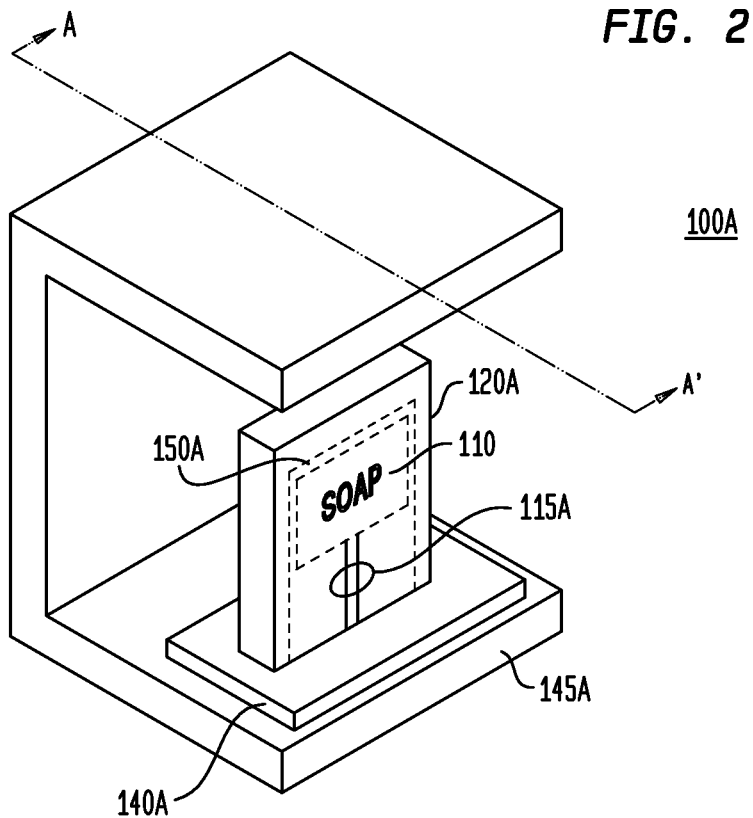
FIG. 2 is a perspective view illustrating an exemplary second system in accordance with the teachings of the present invention.
Figure 3:
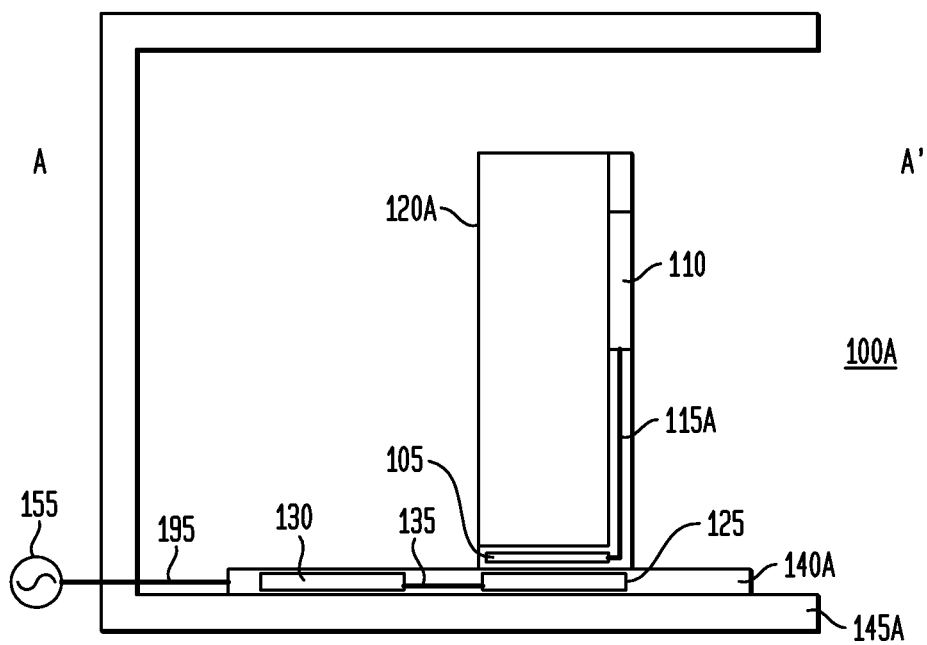
FIG. 3 is a cross-sectional view illustrating the exemplary second system in accordance with the teachings of the present invention.

FIG. 2 is a perspective view illustrating an exemplary second system 100A in accordance with the teachings of the present invention. FIG. 3 is a cross-sectional view through the A-A' plane illustrating the exemplary second system 100A in accordance with the teachings of the present invention. In this exemplary system 100A, the display object 120A is a box, and the illumination source 110 (of second emitting apparatus 150A) consists of a plurality of emitting regions which provide an illuminated description of the contents, "SOAP" in this case. The support structure 145A is a shelving unit, typically found in a shelving display of a retail store or outlet. The (second) power regulator 140A is illustrated as being placed on top of a horizontal surface of the support structure 145A, but could also be integrally formed with the support structure 145A. The power regulator 140A is illustrated as being horizontally disposed, having a substantially flat form factor, and coupled to an AC source 155, such as by being plugged into an AC electrical outlet. In other embodiments, other types of electrical connectors may be provided, such as when the support structure 145A itself provides an AC or DC power source.

The illumination source 110 is disposed on a front side of the display object 120A. An electrical coupling 115A is provided between the illumination source 110, illustrated as a pair of wires (e.g., printed wires of a conductive ink or polymer (which are also coated or sealed)) on the front of the display object 120 and continuing to the underside or bottom of the display object 120, where it connects to the secondary inductor 105. In the illustrated system 100A, having the secondary inductor 105 on the bottom of the display object 120A enables the display object 120A to be energized and provide self-illumination when placed on top of the primary inductor 125 of the power regulator 140. Any or all of the display object 120A, the emitting apparatus 150A, the power regulator 140A and support structure 145A may each be designed to have appropriate form factors to enable such placement of the display object 120A with the secondary inductor 105 in close proximity to the primary inductor 125 and with the illumination source 110 having a proper orientation for the desired display effect.

In addition, while illustrated with only one display object 120A and one power regulator 140A, it should be noted that a typical display system 100A will include many such display objects 120, and correspondingly many primary inductors 125 (or a corresponding number of power regulators 140), so that each display object 120 may provide illumination. In an exemplary embodiment, one controller 130 may also be connected to and utilized to drive a plurality of primary inductors 125.

In other exemplary embodiments, various feedback mechanisms may be utilized to provide that only the display object 120A currently in the front of the display (support structure 145A) will be energized. For example, when a user removes a display object 120A from the front of the support structure 145A, the next display object 120 behind it will then be energized and will provide illumination. Such feedback mechanisms are illustrated and discussed below with reference to FIGS. 11 and 13.

Figure 4:
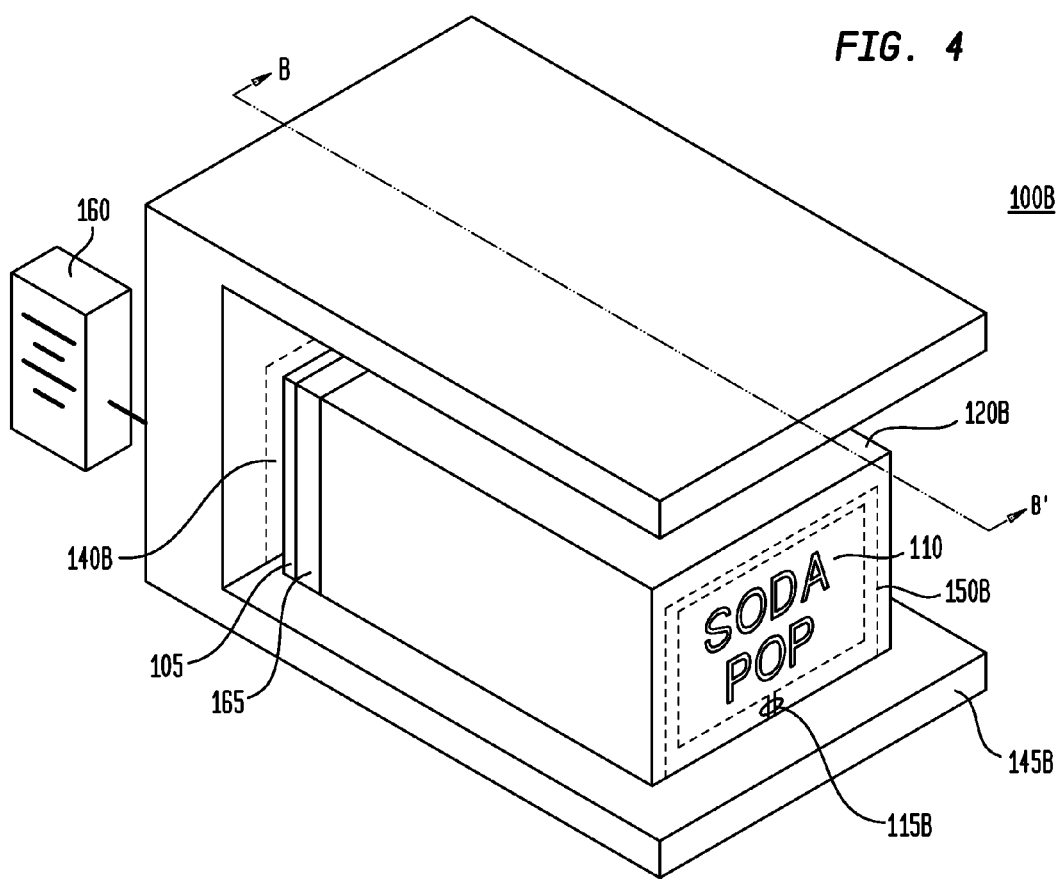
FIG. 4 is a perspective view illustrating an exemplary third system in accordance with the teachings of the present invention.
Figure 5:
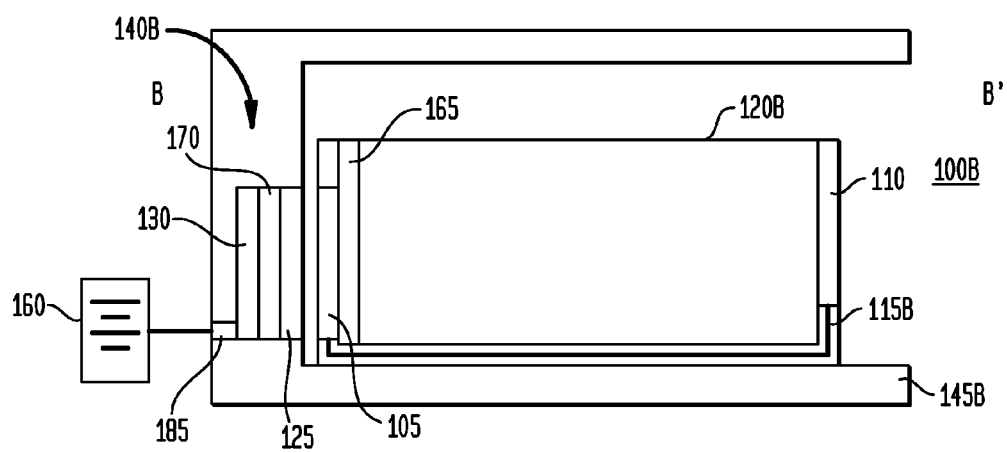
FIG. 5 is a cross-sectional view illustrating the exemplary third system in accordance with the teachings of the present invention.

FIG. 4 is a perspective view illustrating an exemplary third system 100B in accordance with the teachings of the present invention. FIG. 5 is a cross-sectional view through the B-B' plane illustrating the exemplary third system 100B in accordance with the teachings of the present invention. In this exemplary system 100B, the display object 120B is also a box, and the illumination source 110 (of third emitting apparatus 150B) consists of a plurality of emitting regions which provide an illuminated description of the contents, "SODA POP" in this case. The support structure 145B is also a shelving unit, typically found in a shelving display of a retail store or outlet. The power regulator 140B is illustrated as being placed within (and possibly integrally formed with) a rear, vertical surface of the support structure 145B, but could also be separately formed and placed along the rear, vertical surface of the support structure 145B. The (third) power regulator 140B is illustrated as coupled to a DC source 160 using connector 185, such as by being plugged into a battery or an Ethernet connection (for power over Ethernet). In other embodiments, other types of electrical connectors may be provided, such as when the support structure 145B itself provides an AC or DC power source.

The illumination source 110 is also disposed on a front side of the display object 120B. An electrical coupling 115B is provided between the illumination source 110, illustrated as a pair of wires on the front of the display object 120B, which also may be printed, continuing along the underside or bottom of the display object 120B, and then along the rear of the display object 120B, where it connects to the secondary inductor 105. In an exemplary embodiment, all such wiring is printed using a conductive ink or polymer, and may be coated or sealed to provide electrical insulation. In the illustrated system 100B, having the secondary inductor 105 at the rear of the display object 120 enables the display object 120 to be energized and provide self-illumination when placed adjacent to or near the primary inductor 125 of the power regulator 140B, as illustrated. Any or all of the display object 120B, the emitting apparatus 150B, the power regulator 140B and support structure 145B may each be designed to have appropriate form factors to enable such placement of the display object 120B with the secondary inductor 105 in close proximity to the primary inductor 125 and with the illumination source 110 having a proper orientation for the desired display effect.

When the display object 120B will contain metallic contents, such as aluminum cans, a spacer 165 (such as cardboard, an air gap, or both) may be utilized to keep the metallic contents away from the secondary inductor 105, to avoid potential diminution of the magnetic field or flux density from the primary inductor 125. A simple cardboard spacer might need to have a thickness on the order of ¼ to ⅜ inches. Such an exemplary spacer potentially could be thinner, possibly significantly, if it has a ferromagnetic material coated on one side of the spacer. This could be in the form of a printable or coatable ink, or a flexible material with embedded ferromagnetic powder that can be laminated to the bottom surface of the box between the secondary inductor 105 and the metallic content, such as cans. Other methods of maintaining and optimizing the magnetic field and/or the flux density between the primary inductor 125 and the secondary inductor 105 will also be apparent to those having skill in the electronic and packaging arts, and all such variations are considered equivalent and within the scope of the present invention.

In addition, while illustrated with only one display object 120B and one power regulator 140, it should be noted that a typical display system 100B will include many such display objects 120B stacked vertically one on top of the other, and correspondingly many primary inductors 125 and/or power regulators 140 along the rear, vertical surface of the support structure 145, so that each display object 120B may provide illumination from its front portion. In various exemplary embodiments, various feedback mechanisms may be utilized to provide that power regulators 140 are turned off when there is no display object 120B currently in front of it, for example, when a user has removed a display object 120B from the top of the stack of display objects 120B. Such feedback mechanisms are illustrated and discussed below with reference to FIGS. 11 and 13.

Figure 6:
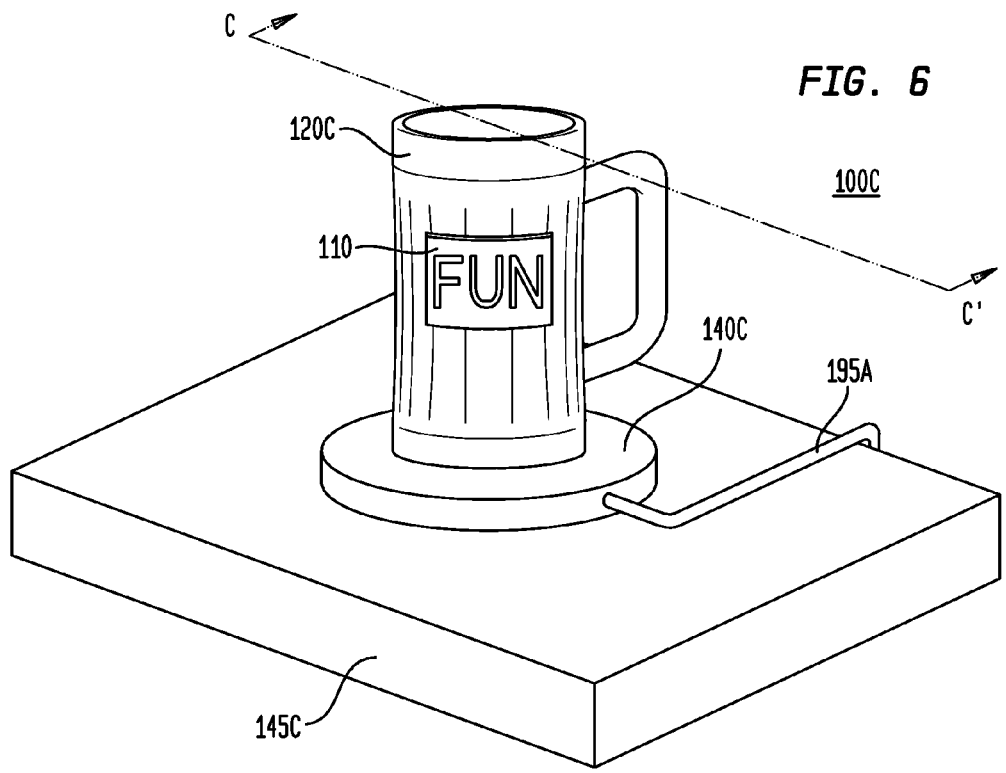
FIG. 6 is a perspective view illustrating an exemplary fourth system in accordance with the teachings of the present invention.
Figure 7:
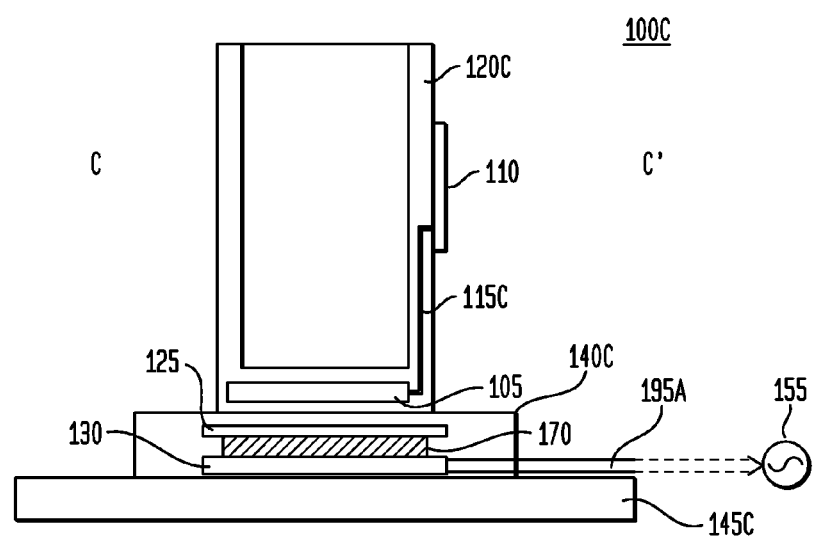
FIG. 7 is a cross-sectional view illustrating the exemplary fourth system in accordance with the teachings of the present invention.

FIG. 6 is a perspective view illustrating an exemplary fourth system 100C in accordance with the teachings of the present invention. FIG. 7 is a cross-sectional view through the C-C' plane illustrating the exemplary fourth system 100C in accordance with the teachings of the present invention. In this exemplary system 100C, the display object 120C is a drinking glass or mug, and the illumination source 110 consists of a single, background emitting region, with a non-illuminated foreground image "FUN", in this case. The support structure 145C is a table top or bar top, typically found in a home, a pub, a restaurant, or other retail store or outlet. The (fourth) power regulator 140C is illustrated as being portable and separate from the support structure 145C, and placed on top of an upper surface of the support structure 145C, but also could be integrally formed within the support structure 145C. The power regulator 140C is illustrated as having an electrical coupling 195A, such as an electrical cord, for connecting to an AC source (not illustrated), such as by being plugged into an AC electrical outlet. In other embodiments, other types of electrical connectors may be provided, such as when the support structure 145C itself provides an AC or DC power source.

The illumination source 110 is also disposed on a front side of the display object 120C. An electrical coupling 115C is provided between the illumination source 110, illustrated as a pair of wires integrally formed within the display object 120C, and continuing to the underside or bottom of the display object 120C, where it connects to the secondary inductor 105, which also may be integrally formed within the display object 120C. In the illustrated system 100C, having the secondary inductor 105 on the bottom of the display object 120C enables the display object 120C to be energized and provide self-illumination when placed on top of the primary inductor 125 of the power regulator 140C. The power regulator 140C and/or the display object 120C may each be designed to have appropriate form factors to enable such placement of the display object 120C with the secondary inductor 105 in close proximity to the primary inductor 125, and with the illumination source 110 having a proper orientation for the desired display effect.

It should be noted that the present invention may be utilized with any type of support structure 145, in addition to those illustrated. For example, the support structure 145 may be implemented as a magazine rack, providing energy for an illumination source 110 to illuminate a front cover of the displayed magazine. Also for example, the support structure 145 may be implemented as a refrigerator or freezer rack or shelf, providing energy for an illumination source 110 to illuminate the front of the refrigerated or frozen displayed object 120. Numerous display and usage variations will be apparent to those having skill in the various marketing, merchandizing, advertising and/or manufacturing arts, and all such variations are within the scope of the present invention.

As illustrated above, the illumination source 110 may be formed to have any desired pattern or illumination regions, for both foreground and background images or spaces. For example, multiple and separate regions or zones (each constituting an illumination source 110) may be illuminated concurrently using a single secondary inductor 105, in any type of mode, such as continuous or blinking. In addition, depending upon the desired complexity of the emitting apparatus 150, the various regions of the illumination source 110 may be energized simultaneously or in other temporal patterns, such as sequentially, and in any of a plurality of illumination modes, such as a continuous mode or a blinking mode. For example, by inclusion of additional switching and control electronics (not separately illustrated) in the emitting apparatus 150, the voltages generated by a single secondary inductor 105 effectively may be steered to any selected illumination source 110. Also for example, without including any such additional switching electronics, a plurality of secondary inductors 105 may be coupled to a corresponding plurality of illumination sources 110, such that depending upon which secondary inductor 105 is receiving a magnetic flux during any selected time interval, the corresponding illumination source 110 will be energized, enabling modes such as a sequential mode, in addition to continuous and blinking modes. For this latter embodiment, such control of the energizing of a given secondary inductor 105 can be provided through the controller 130 of the power regulator 140, through energizing a corresponding primary inductor 125 of a plurality of primary inductors 125, i.e., energizing the primary inductor 125 which corresponds to the selected or given secondary inductor 105, or through a selected drive frequency. Various illumination sequences and modes may also be communicated in real time to a controller 130 of the power regulator 140, via communication with the power regulator 140, such as through an Ethernet or wireless connection (not separately illustrated), and also via other types of sensors (not separately illustrated), such as proximity, pressure, touch sensors, etc. In addition, also by including additional control and switching electronics (not separately illustrated), such illumination sources 110 may also be made to be pixel addressable, to provide variable information dynamically. In the illustrated exemplary embodiments, any and all such illumination patterns and images are within the scope of the present invention.

It should also be noted that because a support structure may and is likely to support many display objects 120 at the same time, such as at a grocery store or other retail outlet, dynamic illumination patterns may be created across the plurality of display objects 120. For example, and without limitation, this may be accomplished by energizing a corresponding primary inductor 125 for a secondary inductor 105 and an illumination source 110 of a first display object 120, energizing another corresponding primary inductor 125 for a secondary inductor 105 and an illumination source 110 of a second display object 120, energizing yet another corresponding primary inductor 125 for a secondary inductor 105 and an illumination source 110 of a third display object 120, and so on, in any order, sequencing, and mode, and in any pattern or layout of the plurality of display objects 120.

Figure 8:
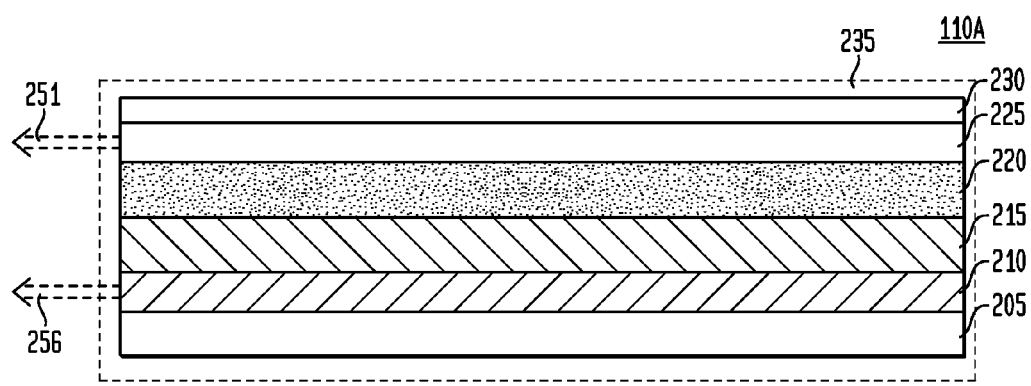
FIG. 8 is a cross-sectional view illustrating an exemplary first illumination source in accordance with the teachings of the present invention.

FIG. 8 is a cross-sectional view illustrating an exemplary first illumination source 110A in accordance with the teachings of the present invention. Such an illumination source 110A may be implemented as an EL display, such as disclosed in co-pending and commonly assigned U.S. Patent Application Publications US 2006/0138948, US 2006/0138944, and US 2007/0040489 (individually and collectively the "EL applications"), which are incorporated herein by reference in their entireties, with the same full force and effect as if set forth herein.

Illumination source 110A comprises a plurality of layers or regions, with each layer or region adjacent the next as illustrated, including a substrate 205, a first conductor 210, a dielectric 215, an emissive (visible light emitting) layer or region 220, a second, transmissive conductor 225, and typically a color layer 230 and a sealant layer 235 (which may also be implemented as a substrate). As described in the EL applications, the illumination source 110A may be created in different regions on a substrate 205, such as in the form of the letters "SOAP" in FIG. 2. In addition, and also as described in the EL applications, the first conductor 210 and the second, transmissive conductor 225 may be formed in their corresponding layers as a respective plurality of first conductors 210 and plurality of second, transmissive conductors 225, each of which may be independently or separately energized, such as for an addressable, regional, or dynamic display. Depending on the selected embodiment, the illumination source 110A also generally includes various color layers (or pixels) 230, which may be printed using a four (or more) color half-tone process, for example, leveling layers or regions (not separately illustrated), and masking layers (260, illustrated in FIG. 10) or regions, and may also include a third conductor (not separately illustrated) within or on top of the second, transmissive conductor 225. Such color layers 230 may comprise one or more fluorescent inks or dyes. Respective electrical contacts or connections 256, 251 are provided to the first conductor(s) 210 and the second, transmissive conductor(s) 225, which, when energized (such as through an applied voltage), provide energy to the emissive layer 220. The energy or power supplied to the emissive layer 220 causes incorporated light-emitting compounds or particles, discussed below, to emit light in the visible (and typically some near-uv) spectra. The second, transmissive conductor 225 allows the visible light generated in the emissive layer 220 to pass through substantially, allowing visibility of the emitted light to any observer located on the display side (i.e., the transmissive conductive layer 225 side) of the illumination source 110A.

Most extraordinary, the illumination source 110A may be produced to be very flat, with minimal thickness, having a depth on the order of a few sheets of paper. Indeed, the substrate 205 may be comprised of a single sheet of paper, for example, with all the remaining layers applied in succession with varying thicknesses through conventional printing and/or coating processes known to those of skill in the printing and coating arts. In exemplary embodiments, the substrate 205 may be part of the display object 120, such as the package, box or container, for example, with the remaining layers printed directly on the display object 120. In other embodiments, and not separately illustrated (but described in the EL applications), a substantially clear substrate 205 is utilized as a top layer, with the remaining layers also applied in succession, and with the bottom layer providing sealant layer 235.

For example, working prototypes have been created using a wide variety of printing and coating processes. As a consequence, as used herein, "printing" means, refers to and includes any and all printing, coating, rolling, spraying, layering, sputtering, deposition, lamination and/or affixing processes, whether impact or non-impact, currently known or developed in the future, including without limitation screen printing, inkjet printing, electro-optical printing, electroink printing, photoresist and other resist printing, thermal printing, laser jet printing, magnetic printing, pad printing, flexographic printing, hybrid offset lithography, Gravure and other intaglio printing. All such processes are considered printing processes herein, may be utilized equivalently, and are within the scope of the present invention.

The various compounds and particles utilized may be contained within various polymers, binders or other dispersion agents which may be heat-cured or dried, air dried under ambient conditions, or uv cured, for example, and all such variations are within the scope of the present invention.

A substrate 205 may be formed from virtually any material, with the suitability of any selected material determined empirically. A substrate 205, without limitation of the generality of the foregoing, may comprise one or more of the following, as examples: paper, coated paper, plastic coated paper, fiber paper, cardboard, poster paper, poster board, books, magazines, newspapers, wooden boards, plywood, and other paper or wood-based products in any selected form; plastic materials in any selected form (sheets, film, boards, and so on); natural and synthetic rubber materials and products in any selected form; natural and synthetic fabrics in any selected form; glass, ceramic, and other silicon or silica-derived materials and products, in any selected form; concrete (cured), stone, and other building materials and products; or any other product, currently existing or created in the future. In an exemplary embodiment, a substrate 205 may be selected which provides a degree of electrical insulation (i.e., has a dielectric constant or insulating properties sufficient to provide electrical isolation of the first conductor 210 on that (second) side of the illumination source 110A). In additional exemplary embodiments, any type of substrate 105 may be utilized, with additional sealing or encapsulating layers applied to a surface of the substrate 205 (such as lacquer and vinyl, for example).

There are primarily two types of methods of constructing the various illumination sources 110A of the present invention. In a first build-type or "standard build", as illustrated in FIG. 8, successive layers are applied to an opaque or non-transmissive substrate 205 (with or without one or more sealing layer(s)), with light being emitted through the top layer of the standard build. In other embodiments referred to as a second build-type or "reverse build", as mentioned above, successive layers are applied in reverse order to a clear or otherwise optically transmissive substrate 205, with light being emitted through the substrate layer of the reverse build. For example, polyvinyl chloride or other polymers may be utilized as substrates for a "reverse build", with a clear substrate forming a top layer, and all remaining layers applied in a reverse order, such that the first conductor 210 is applied last or next to last (followed by a protective coating).

The first conductor(s) 210 may then be printed or coated, in any selected configuration or design, onto the substrate 205, forming one or more electrodes utilized to provide energy or power to one or more selected portions of the emissive layer 220 (such as the entire area of the emissive layer 220 or selected regions or pixels within the emissive layer 220). The first conductor(s) 210 may be created in any selected shape to have corresponding illumination, such as in a plurality of separate, electrically isolated strips, to provide row or column selection, for discrete pixel illumination, or as a plurality of small dots for individual pixel selection, or as one or more sheets or sections, to provide illumination of one or more sections of the emissive layer 220. For example, a plurality of first conductors 210 may be created to illuminate different sections of the display independently of each other, such as in any selected sequence or pattern. The thickness (or depth) of the first conductor 210 is not particularly sensitive or significant and may be empirically determined based upon the selected material and application process, requiring only sufficient thickness to conduct electricity and not have open circuits or other unwanted conduction gaps, while concomitantly maintaining the desired aspect ratio or thickness of the finished illumination source 110A.

In the selected embodiments, the first conductor 210 is formed utilizing a conductive ink or polymer, such as a silver (Ag) ink. Such a conductive ink is applied to the substrate 205 via one or the printing processes discussed above, creating the first conductor 210. Other conductive inks or materials may also be utilized to form the first conductive layer 110, such as copper, tin, aluminum, gold, noble metals or carbon inks, gels or other liquid or semi-solid materials. In addition, any other printable or coatable conductive substances may be utilized equivalently to form the first conductor 210, and are disclosed in the EL applications. A first conductor 210 may also be formed using similar compounds comprising the second, transmissive conductor 225, described below, such that the illumination source 110A may provide light through either or both sides of the illumination source 110A.

Conductive polymers may also be utilized to form the first conductor 210. For example, polyethylene-dioxithiophene may be utilized, such as the polyethylene-dioxithiophene commercially available under the trade name "Orgacon" from Agfa Corp. of Ridgefield Park, N.J., USA. Other conductive polymers, without limitation, which may be utilized equivalently include polyaniline and polypyrrole polymers, for example.

In an exemplary embodiment, the secondary inductor 105 is also printed, also using a conductive ink or polymer, and may be printed concurrently, at least in part, with the printing of the first conductor 210. In another exemplary embodiment, the secondary inductor 105 is scrape printed inside corresponding grooves of a substrate 205, in which a conductive ink or polymer is used to coat a substrate having circular grooves which will define the secondary inductor 105, and with the excess conductive ink or polymer scraped off using a doctor blade, with the result that the conductive ink or polymer which remains in the grooves is cured and forms the secondary inductor 105. For example, the secondary inductor 105A having a planar, substantially flat form factor, as illustrated in FIG. 10, may be manufactured using such a scrape printing process.

The dielectric layer 215 may be coated or printed over the first conductor 210, with the emissive layer 220 coated or printed over the dielectric layer 215. For example, one or more coatings of barium titanate ($BaTiO_3$) and/or titanium dioxide, as particles suspended in a polymer, is utilized, both to provide for smoothness for printing of additional layers, and to adjust the dielectric constant of the electroluminescent compound in the emissive layer 220. A wide variety of dielectric compounds may be utilized to form the various dielectric layers, and all are within the scope of the present invention, and which may be included within heat- or uv-curable binders or other polymers, for example. Exemplary dielectric compounds utilized to form the dielectric layers are disclosed in the EL applications.

The emissive layer 220 is then applied, such as through printing or coating processes discussed above, over the dielectric layer 215. The emissive layer 220 may be formed of any substance or compound capable of or adapted to emit light in the visible spectrum (or other electromagnetic radiation at any selected frequency) in response to an applied electrical field, such as in response to a voltage difference supplied to the first conductor 210 and the second, transmissive conductor 225. Such electroluminescent compounds include various phosphors, which may be provided in any of various forms and with any of various dopants, such as a zinc sulfide or a cadmium sulfide doped with copper, magnesium, strontium, cesium, rare earths, etc. One such exemplary phosphor is a zinc sulfide (ZnS-doped) phosphor, which may be provided in an encapsulated form for ease of use, such as the micro-encapsulated ZnS-doped phosphor encapsulated powder from the DuPont™ Luxprint® electroluminescent polymer thick film materials. While not combined with a dielectric in the exemplary embodiments, this phosphor may also be combined with a dielectric such as barium titanate or titanium dioxide, to adjust the dielectric constant of this layer. The EL particles forming the emissive layer 220 may be utilized in or suspended in a polymer form having various binders, and also may be separately combined with various binders (such as phosphor binders available from DuPont or Conductive Compounds), both to aid the printing or other deposition process, and to provide adhesion of the phosphor to the underlying and subsequent overlying layers. The emissive layer 220 may also be provided in either uv-curable or heat-curable forms. A wide variety of equivalent electroluminescent compounds are available, are within the scope of the present invention, and are disclosed in the EL applications.

In addition, depending upon the selected embodiment, colorants, dyes and/or dopants may be included within any such emissive layer. In addition, the phosphors or phosphor capsules utilized to form an emissive layer may include dopants which emit in a particular spectrum, such as green or blue. In those cases, the emissive layer may be printed to define pixels for any given or selected color, such as RGB or CMYK, to provide a color display.

In another exemplary embodiment, one or more color layers 230 are provided independently of or decoupled from the emissive layer 220, either forming separate pixels in one or more color layer(s), or forming an image to be illuminated, such as a four, six or eight color image, for example.

Following application of the emissive layer 220, the second, transmissive conductor 225 is applied, such as through printing or coating processes discussed above, over the emissive layer 220 (and any additional layers). The second, transmissive conductor 225 may be comprised of any compound which: (1) has sufficient conductivity to energize selected portions of the apparatus in a predetermined or selected period of time; and (2) has at least a predetermined or selected level of transparency or transmissibility for the selected wavelength(s) of electromagnetic radiation, such as for portions of the visible spectrum. In an exemplary embodiment of illumination source 110A, polyethylene-dioxithiophene (e.g., Orgacon), a polyaniline or polypyrrole polymer, indium tin oxide (ITO) and/or antimony tin oxide (ATO) is utilized to form the second, transmissive conductor 225. While ITO or ATO provides sufficient transparency for visible light, its impedance or resistance is comparatively high (e.g., 20 kΩ), generating a correspondingly comparatively high (i.e., slow) time constant for electrical transmission across this layer of the apparatus 100, such as down a corresponding electrode. Other compounds having comparatively less impedance may also be utilized, such as polyethylene-dioxithiophene. The second, transmissive conductor 225 may also be combined with various binders, such as binders which are curable under various conditions, such as exposure to ultraviolet radiation (uv curable).

As mentioned above, in operation, a voltage difference is applied across (1) the second, transmissive conductor 225 and (2) the first conductor 210, thereby providing energy to the emissive layer 220. The supplied voltage is in the form of alternating current (AC) in the exemplary embodiments. The supplied voltage is generally over 60 Volts, and may be higher (closer to 100 V) for lower AC frequencies.

As discussed below, the peak voltages generated by the secondary inductor 105 also may be as high as 100-150V, and in some cases as high as 400 V peak-to-peak, sufficient to energize the emissive layer 220 and without causing electrical breakdown of the various layers. The supplied voltage should correspond to the type of electroluminescent compounds used in the emissive layer 220, as they may have varying breakdown voltages and may emit light at voltages different from that specified above. The energy or power supplied to the emissive layer 220 causes the incorporated electroluminescent compounds to emit visible light at selected frequencies, depending upon the corresponding bandgap(s) of the particular or selected dopant(s) utilized within a selected electroluminescent compound. As the emitted light passes through the second, transmissive conductor 225 for corresponding visibility, the illumination source 110A is adapted to operate and is capable of operating as a light emitting display.

Following application of the second, transmissive conductor 225, additional coatings or layers may also be applied to the illumination source 110A, such as color layers 230, filters, and/or dyes may be applied, along with a sealing (encapsulating) layer 235. In selected embodiments, a plurality of fluorescent or other color conversion materials, inks, dyes, pigments or other colorants are utilized to provide such a color layer 230. Various protective or sealing and/or topological leveling layers 235 are applied, such as a transparent or transmissive protective or sealant coatings, such as an ultraviolet (uv) curable sealant coating. Other compounds may also be utilized in one or more sealing and topological leveling layers, including lacquers and vinyls, and are disclosed in the EL applications. The protective or sealing and/or topological leveling layers 235 may also be formed by lamination over the second, transmissive conductor 225 or color layer 230, or over the substrate 205, or both.

Figure 9:
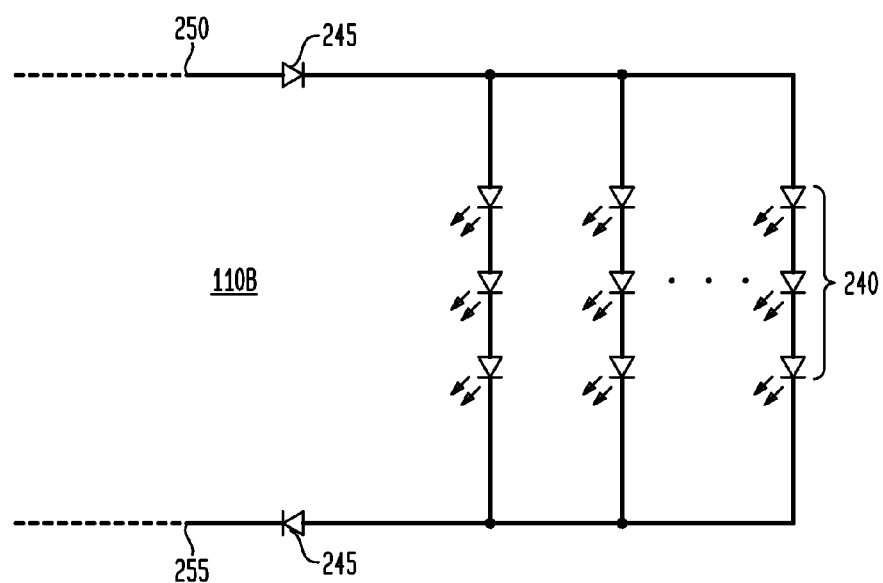
FIG. 9 is a circuit diagram illustrating an exemplary second illumination source in accordance with the teachings of the present invention.

FIG. 9 is a circuit diagram illustrating an exemplary second illumination source 110B in accordance with the teachings of the present invention. As illustrated, the second illumination source 110B comprises one or more of a plurality of light emitting diodes 240, and may also optionally include one or more blocking or rectifying diodes 245, or may be coupled to a full wave (AC bridge) rectifier comprising a plurality of diodes (not separately illustrated). An applied, forward bias voltage across the one or more LEDs 240 will cause the LEDs to emit light in the visible spectrum, at a selected wavelength corresponding to the type(s) of LEDs utilized. Not separately illustrated, the illumination source 110B also will typically also be sealed or encapsulated. It should also be noted that the forward bias voltage for the LEDs 240 is typically appreciable less than the voltages required for energizing an EL illumination source 110, such as illumination source 110A. In addition, depending on the selected LEDs 240 and their breakdown voltage under a reverse bias, rectification of an AC voltage from the secondary inductor 105 may not be necessary. In the exemplary embodiment illustrated, however, blocking diodes 245 (at nodes 250, 255) are utilized to couple the plurality of light emitting diodes 240 to the secondary inductor 105, with both the plurality of light emitting diodes 240 and the blocking diodes comprising the second illumination source 110B. Also, not separately illustrated, to accommodate an AC voltage from the secondary inductor 105, various strings of the LEDs 240 may be placed in an orientation opposite that illustrated, to be energized during a negative half-cycle of the an AC voltage from the secondary inductor 105.

As used herein for purposes of the present invention, the term "LED" and its plural form "LEDs" should be understood to include any electroluminescent diode or other type of carrier injection- or junction-based system which is capable of generating radiation in response to an electrical signal, including without limitation, various semiconductor- or carbon-based structures which emit light in response to a current or voltage, light emitting polymers, organic LEDs, and so on, including within the visible spectrum, or other spectra such as ultraviolet or infrared, of any bandwidth, or of any color or color temperature.

Also not separately illustrated, the illumination sources 110A and 110B also will provide the capability for electrical contacts to be formed with corresponding nodes of the secondary inductor 105, such as through a coupling 115. In an exemplary illumination source 110A, those electrical contacts are provided to each of the relevant first conductor(s) 210 and second, transmissive conductors 225, and with the coupling 115 and the secondary inductor 105 integrally formed using a conductive ink or polymer, such as illustrated in FIG. 10 (251, 256). In other embodiments, such as using illumination source 110B, those electrical contacts are provided at nodes 250, 255 (illustrated in FIG. 9) to the secondary inductor 105. In exemplary embodiments, the illumination sources 110A and 110B are coupled directly to the secondary inductor 105, without any intervening components, such as batteries, capacitors, resistors, switches, etc.

In addition to the EL and LED types of illumination sources 110 illustrated in FIGS. 8 and 9, those having skill in the electronic arts will recognize that other types of light emission sources, whether currently known or developed in the future, may be utilized equivalently, and that all such light emission sources are within the scope of the present invention, with illumination sources 110A and 110B providing suitable examples of the inventive concept.

Figure 10:
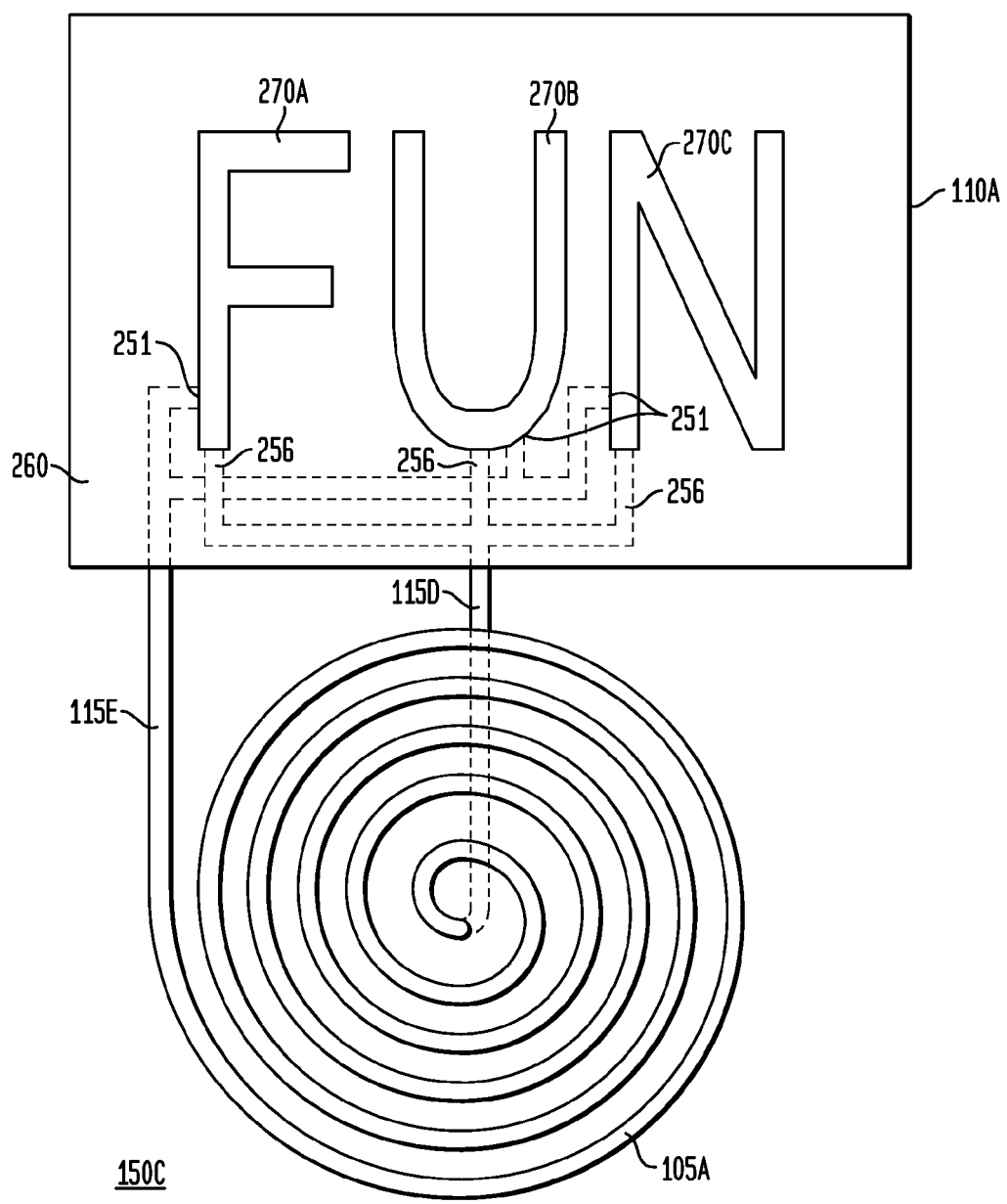
FIG. 10 is a circuit and block diagram illustrating an exemplary fourth emitting apparatus in accordance with the teachings of the present invention.

FIG. 10 is a circuit and block diagram illustrating an exemplary fourth emitting apparatus 150C in accordance with the teachings of the present invention. As illustrated in FIG. 10, the emitting apparatus 150C comprises a printed or coated illumination source 110A (previously discussed with reference to FIG. 8), and a secondary inductor 105A, formed by printing a conductive ink or polymer, a portion of which (forming or connecting with lead or coupling 115D) may be printed along with the first conductor 210, followed by printing of an electrical insulator (dielectric), followed by printing the remaining portion of the secondary inductor 105A (and also integrally forming or connecting with lead or coupling 115E). Both the secondary inductor 105A and the illumination source 110A have a substantially flat form factor, highly suitable for use as an adhesive label, a box, a carton, or any other form of packaging. In an exemplary embodiment, a silver or copper conductive ink is utilized for the secondary inductor 105A, and formed to have 34 turns, be substantially flat, and have a diameter of approximately 10 cm. Coupling of the secondary inductor 105A to the second, transmissive conductor 225 and the first conductor 210 is provided through leads 115E and 115D, respectively, which are illustrated as dashed lines to indicate that they would not be visually apparent, being covered by a masking layer 260 and any other sealing layers 235 or color layers 230. As indicated above, in an exemplary embodiment, the secondary inductor 105A and leads or couplings 115D and 115E may be printed, at least partially concurrently with the first conductor(s) 210. The exemplary illumination source 110A includes several separate emitting regions 270A, 270B, and 270C, which may be configured in any shape, design, or color(s), and which may be addressed separately or simultaneously, in any mode, such as sequential or blinking, as discussed above. In operation, the voltages generated by the secondary inductor 105A are provided to the first conductor 210 and the second, transmissive conductor 225, which in turn causes the emissive layer 220 to emit light in selected spectra.

Figure 11:
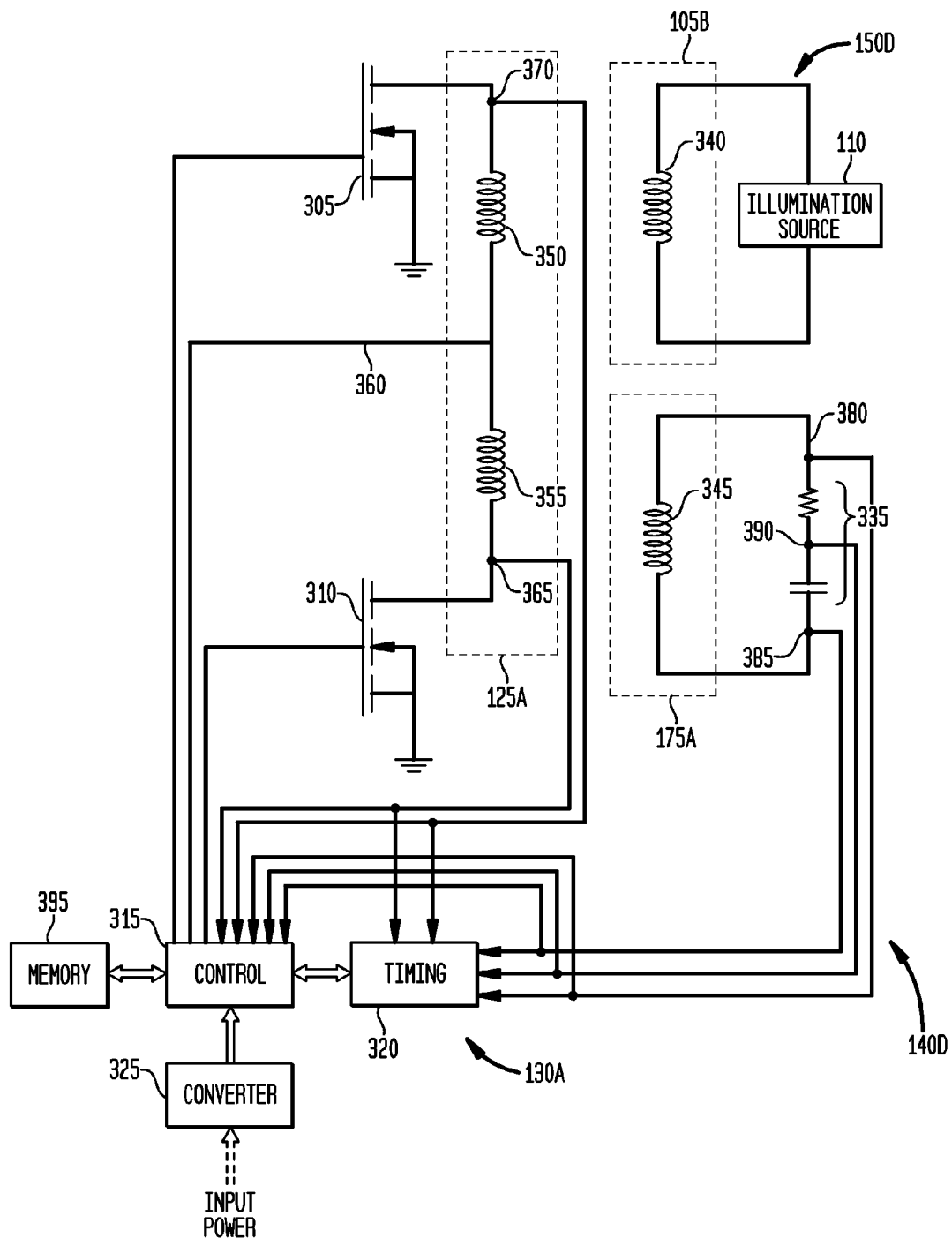
FIG. 11 is a circuit and block diagram illustrating an exemplary fifth power regulator apparatus and exemplary fifth emitting apparatus in accordance with the teachings of the present invention.
Figure 12:
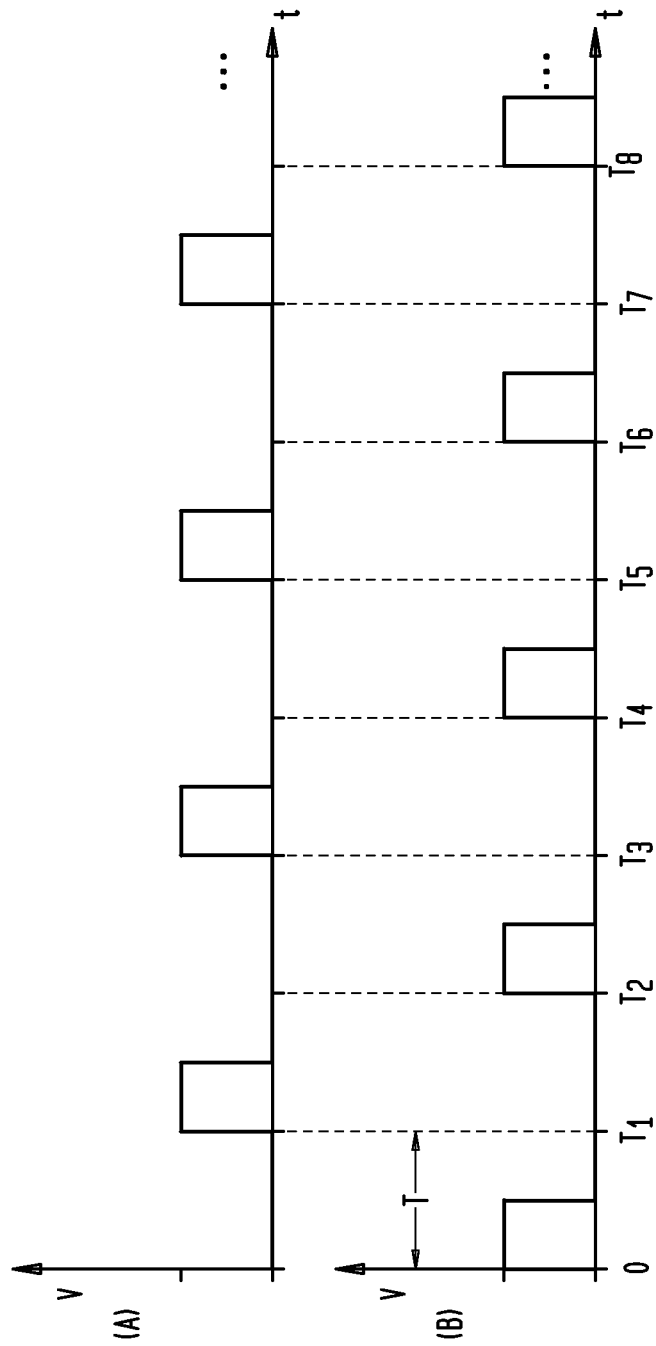
FIG. 12, divided into

FIG. 11 is a circuit and block diagram illustrating an exemplary fifth power regulator apparatus 140D and an exemplary fifth emitting apparatus 150D in accordance with the teachings of the present invention. FIG. 12, divided into FIGS. 12A and 12B, is a diagram illustrating an exemplary first timing scheme in accordance with the teachings of the present invention, illustrating exemplary control voltages applied by the control logic block 315 to switching (power) transistors 305 and 310, respectively, with the control logic block 315 effectively alternating which transistor 305, 310 is on and conducting during a given interval, illustrated as switching periods "T" ($T_1$, $T_2$, $T_3$, etc.) (and there also may be some time intervals in which both transistors 305, 310 may be in an off state). As illustrated, primary inductor 125A of the power regulator 140D is implemented as a primary winding of a center-tap transformer, having a first primary inductor 350 and a second primary inductor 355. In an exemplary embodiment, the center-tap (node 360) is maintained at about 12 Volts by control logic block 315, although the center-tap voltage may vary depending upon the desired voltage levels for powering a selected illumination source 110. A power converter 325 may be utilized to convert power from a source, such as AC line power or a DC voltage, to the selected voltage levels utilized by the control logic block 315 to provide gate control voltages for transistors 305 and 310 and to provide the center-tap voltage, and may be implemented as known or becomes known by those having skill in the electronic arts. While transistors 305 and 310 are illustrated as n-channel enhancement MOSFETs, any and all other types of (power) transistors may be utilized equivalently, such as the bipolar junction transistors illustrated in FIG. 13, and any and all such transistors are considered within the scope of the present invention.

Exemplary power regulator 140D operates using a flyback circuit configuration. Following the turning on of transistor 305 and energy being stored in first primary inductor 350, as transistor 305 is turned off, a comparatively large (positive) voltage is generated across first primary inductor 350, with a comparable or corresponding voltage generated in secondary inductor 105B, illustrated as an inductive circuit element 340. The voltage in the secondary inductor 105B is coupled to and energizes an illumination source 110, which then emits light in the positive-half of a generated AC voltage cycle. (It should be noted that in FIG. 11, the illumination source 110 may be modeled as a corresponding electrical circuit, as an equivalent (Thevenin equivalent) series resistor and capacitor (RC) circuit 335, which then may be utilized in a second, feedback secondary inductor 175A.) In a next cycle, following the turning on of transistor 310 and energy being stored in second primary inductor 355, as transistor 310 is turned off, a comparatively large (negative) voltage is generated across second primary inductor 355, with a comparable or corresponding voltage generated in secondary inductor 105B, illustrated as an inductive circuit element 340, which is then provided to and energizes the illumination source 110, emitting light in the negative-half of a generated AC voltage cycle. A typical or exemplary on-time or on pulse to the transistors 305, 310 may have a duration in the range of 3-10 microseconds, and an exemplary switching frequency may be in the range of 1 kHz to 12 kHz, for example.

The various primary and secondary voltages may be determined through a plurality of factors, including without limitation through the turns ratios of the primary inductor 125A and the secondary inductor 105B, inductor sizing, and also through the switching on-time (pulse duration), with a comparatively larger on time (i.e., charging duration) providing additional energy into the magnetic field of the primary inductor 125A which is then coupled to the secondary inductor 105B. In an exemplary embodiment mentioned above, with the secondary inductor 105A having 34 turns (such as for ease of printability), a similar number of turns may be utilized for the secondary inductor 105B and for each of the first primary inductor 350 and the second primary inductor 355 (e.g., each having 34 turns). Other ratios also may be utilized to provide the selected step-up or step-down voltage levels or to affect the inductance levels, for example. For example, the number of turns for the primary inductor 125 may be selected based upon a selection of peak currents and voltages which are convenient or appropriate for the design of the driver circuitry (transistors 305, 310 and control logic block 315). Also for example, the number of turns for the secondary inductor 105 may be maximized to the extent practicable in order to reduce the resonant frequency of the emitting apparatus 150 (discussed below), which may allow effective energizing of comparatively larger illumination sources 110, which would have a comparatively larger series resistance and capacitance (a comparatively larger RC value).

As the illumination source 110 may have a large resistance, the voltages generated in the secondary inductor 105B may tend to be damped comparatively quickly. The voltage pulse generated in the secondary inductor 105B will generally be a function of the resonant frequency of the illumination source 110, which in turn is a function of the inductance of the secondary inductor 105B and the capacitance of the illumination source 110 (approximately proportional to $1/2\pi\sqrt{LC}$, for a first order approximation), and will be "reflected" or otherwise induced or received in the corresponding primary inductor 350, 355. Using voltage feedback (from nodes 365, 370), with the known center-tap 360 voltage, the pulse duration or width of the voltage pulse may be determined by timing block 320 or control logic block 315, such as by using a zero-crossing detector (not separately illustrated) as known or becomes known in the electronic arts. Knowing the inductance of the secondary inductor 105B, the capacitance of the illumination source 110 may then be determined, and the on-time of the transistors 305, 310 and/or the switching frequency may be varied to provide sufficient energy into the first primary inductor 350 and second primary inductor 355 to generate the desired peak voltages in the secondary inductor 105B for driving the selected illumination source 110. The measured pulse duration (or width) may also be utilized to adjust the on-time of the transistors 305, 310 and/or the switching frequency to provide brightness control for the selected illumination source 110. Adjusting the on-time of the transistors 305, 310 is one method to implement pulse-width modulation for controlling the voltages generated in the primary inductor 125 and the secondary inductor 105, with any adjustment of the switching frequency providing frequency modulation for controlling the voltages generated in the primary inductor 125 and the secondary inductor 105. In an exemplary embodiment, such as emitting apparatus 150A illustrated in FIG. 10, the magnitude of the peak voltages may be as high as 150V or more, with a switching on time duration and switching frequency as mentioned above.

In addition, measuring the voltage pulse duration (or width) may also be utilized to provide feedback concerning whether any display object 120 is present, for example, due to a change in the voltage pulse when the display object 120 is removed (e.g., reflecting a change in the resonant frequency, from that of the illumination source 110 and secondary inductor 105B to that of the first or second primary inductor 350, 355 only, which would be quite different). As mentioned above, this feedback mechanism may be utilized to detect the presence of or removal of a display object in the various systems 100, 100A, 100B, 100C, and then to power on or power off the corresponding primary inductor(s) 125. In addition, this data may be stored in memory 395 (or transmitted within the system 100), allowing immediate tracking of inventory, determination of when display objects 120 are removed from the support structure 145, etc. Those of skill in the art will recognize innumerable types of information which may be tracked and reported, and all such types of data collection and reporting are within the scope of the present invention.

Other types of feedback may also be included. For example, a separate circuit having a second, feedback secondary inductor 175A and series resistance and capacitance (RC) 335 (to model an illumination source 110) optionally may be included within the power regulator 140D, with detected voltages and/or currents (at nodes 380, 385, and/or 390) utilized to provide corresponding feedback signals to the timing block 320 and/or the control logic block 315. For example, the second, feedback secondary inductor 175A and series resistance and capacitance (RC) 335 may be implemented to model a selected, known emitting apparatus 150, and provide corresponding feedback signals to the timing block 320 and/or the control logic block 315, such as to adjust the on-time durations of the transistors 305 and 310 and/or the switching frequency.

The controller 130A of the power regulator 140D, or the controller 130B of the power regulator 140E discussed below, optionally may also include a memory 395, which may be any type or form of memory circuit or device (also as described below). Such a memory 395 may be utilized, for example, to store values for switching frequency and/or on time durations (pulse widths) of the corresponding switches (transistors 305, 310 or transistors 400, 410, 415 and 405). In addition, these values may also be provided in the form of a look up table ("LUT") corresponding to measured pulse widths or voltages (e.g., induced in the primary inductor 125 or as a feedback signal from second, feedback secondary inductor 175), for example, which may also simplify the controller 130A, 130B design.

It should also be noted that the AC voltage generated in the secondary inductor 105 is particularly suitable for an EL-based illumination source 110 such as illumination source 110A, thereby avoiding saturation of charge carriers on either side of the emissive layer 220.

Figure 13:
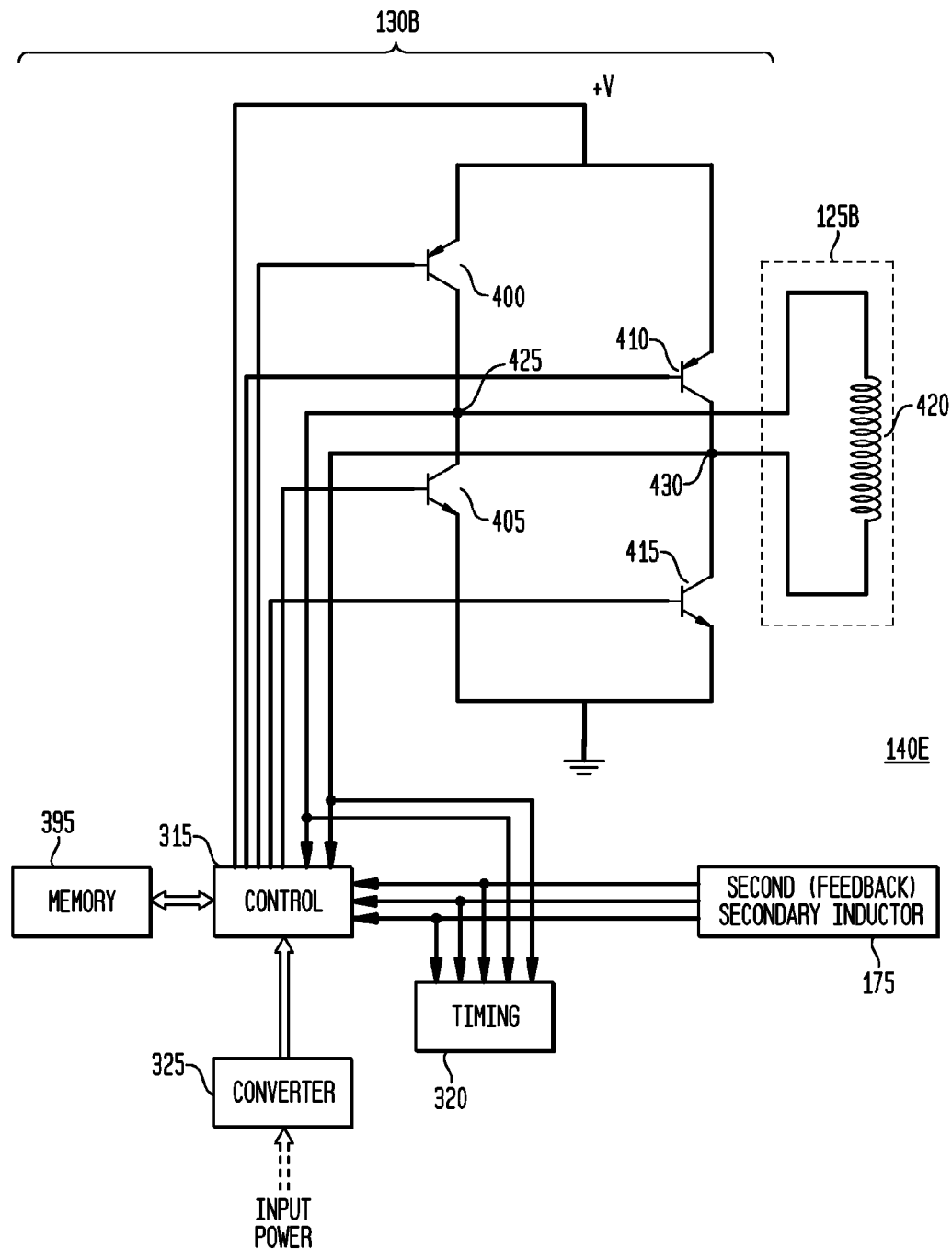
FIG. 13 is a circuit and block diagram illustrating an exemplary sixth power regulator apparatus in accordance with the teachings of the present invention.
Figure 14:
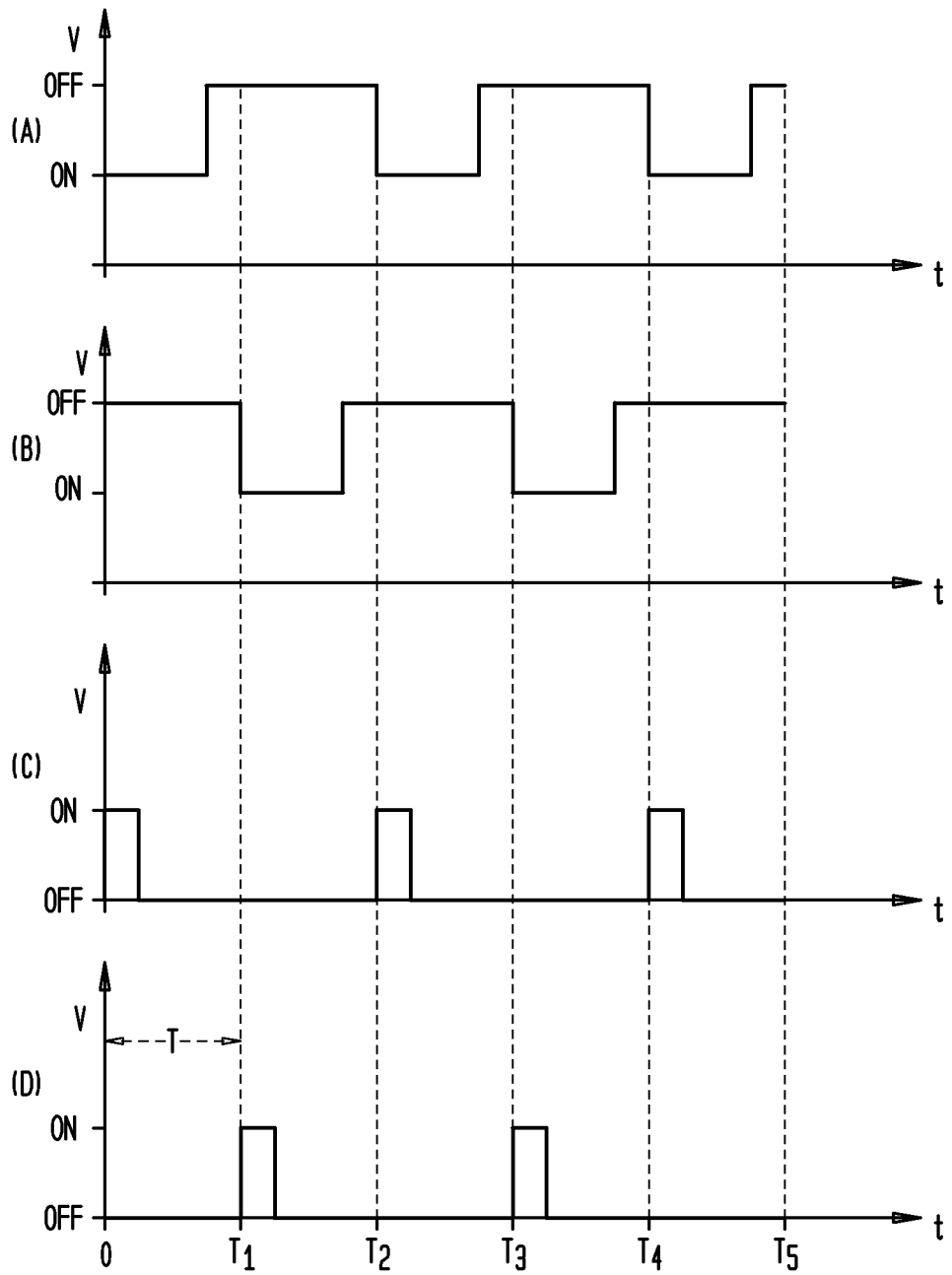
FIG. 14, divided into

FIG. 13 is a circuit and block diagram illustrating an exemplary sixth power regulator apparatus 140E in accordance with the teachings of the present invention. FIG. 14, divided into FIGS. 14A, 14B, 14C, and 14D is a diagram illustrating an exemplary second timing scheme in accordance with the teachings of the present invention, illustrating exemplary control voltages applied by the control logic block 315 to the bases of switching (power) transistors 400, 410, 415 and 405, respectively, with the control logic block 315 effectively alternating which pair of transistors 400, 415 or transistors 410, 405 are on and conducting during a given interval, also illustrated as switching periods "T" ($T_1$, $T_2$, $T_3$, etc.) (and with some time intervals in which all transistors 400, 405, 410 and 415 may be in an off state). This power regulator 140E may be utilized with any of the emitting apparatuses 150 previously discussed. The control logic block 315, timing block 320, converter 325, memory 395, and second, feedback secondary inductor 175 function as discussed above, and implement a different switching and timing scheme for the bipolar junction transistors 400, 405, 410 and 415. In addition, feedback signals may also be taken from nodes 425, 430 coupled to the primary inductor 125B, illustrated as inductor 420, in addition to feedback signals provided by the second, feedback secondary inductor 175, and feedback from the waveforms induced by the secondary inductor 105 (also obtainable at nodes 425, 430). While bipolar junction transistors 400, 410 are illustrated as p-type, and while bipolar junction transistors 405, 415 are illustrated as n-type, other types of (power) transistors may be utilized equivalently, and any and all such transistors are considered within the scope of the present invention.

In operation, transistors 400 and 415 are turned on at least partially during the same time interval (FIGS. 14A and 14C) while transistors 405 and 410 are in an off state, for current to flow in a path through transistor 400, node 425, inductor 420, node 430, and transistor 415, and with a voltage having a first polarity developed across inductor 420 when transistors 400 and 415 are turned off, with a comparable or corresponding voltage generated in a secondary inductor 105 (not separately illustrated in FIG. 13). During a next switching cycle, transistors 410 and 405 are turned on at least partially during the same time interval (FIGS. 14B and 14D) while transistors 400 and 415 are in an off state, for current to flow in a path through transistor 410, node 430, inductor 420, node 425, and transistor 405, and with a voltage having a second, opposite polarity developed across inductor 420 when transistors 410 and 405 are turned off, and with a comparable or corresponding voltage also generated in a secondary inductor 105 (not separately illustrated in FIG. 13).

The various voltages also may be determined through the turns ratios of the primary inductor 125B and the secondary inductor 105, inductor sizes, and through the switching on-time durations, as mentioned above. Also as mentioned above, the pulse widths (duration of the on-times of transistors 400, 405, 410 and 415) and/or the switching frequency may be varied to provide sufficient energy into the primary inductor 125B to generate the desired peak voltages in a secondary inductor 105 for driving the selected illumination source 110.

Any type of power regulator 140 topology may be utilized within the scope of the present invention. In addition to the illustrated topologies, such as the flyback topology, the power regulator 140 circuitry may be configured, for example and without limitation, to have a boost, buck, buck-boost, quadratic, cascaded (or two-stage), forward, resonant (or resonant combinations) converter or regulator topology, or any other AC-AC, AC-DC, DC-AC, or DC-DC converter or regulator circuit topology, including non-switching converter, regulator, or transformer (having separable primary and secondary coils) topologies, and any and all such circuit topologies are within the scope of the present invention.

As indicated above, the controller 130 may be any type of controller or processor, and may be embodied as any type of digital logic adapted to perform the functionality discussed herein. As the term controller or processor is used herein, a controller or processor may include use of a single integrated circuit ("IC"), or may include use of a plurality of integrated circuits or other components connected, arranged or grouped together, such as controllers, microprocessors, digital signal processors ("DSPs"), parallel processors, multiple core processors, custom ICs, application specific integrated circuits ("ASICs"), field programmable gate arrays ("FPGAs"), adaptive computing ICs, associated memory (such as RAM, DRAM and ROM), and other ICs and components. As a consequence, as used herein, the term controller or processor should be understood to equivalently mean and include a single IC, or arrangement of custom ICs, ASICs, processors, microprocessors, controllers, FPGAs, adaptive computing ICs, or some other grouping of integrated circuits which perform the functions discussed herein, with any associated memory, such as microprocessor memory or additional RAM, DRAM, SDRAM, SRAM, MRAM, ROM, FLASH, EPROM or EPROM. A controller or processor (such as controller 130), with its associated memory, may be adapted or configured (via programming, FPGA interconnection, or hard-wiring) to perform the methodology of the invention, as discussed above and below. For example, the methodology may be programmed and stored, in a controller 130 with its associated memory (and/or memory 395) and other equivalent components, as a set of program instructions or other code (or equivalent configuration or other program) for subsequent execution when the controller or processor is operative (i.e., powered on and functioning). Equivalently, when the controller or processor may implemented in whole or part as FPGAs, custom ICs and/or ASICs, the FPGAs, custom ICs or ASICs also may be designed, configured and/or hard-wired to implement the methodology of the invention. For example, the controller or processor may be implemented as an arrangement of controllers, microprocessors, DSPs and/or ASICs, which are respectively programmed, designed, adapted or configured to implement the methodology of the invention, in conjunction with a memory 395.

The memory 395, which may include a look up table ("LUT") or data repository (or database), may be embodied in any number of forms, including within any computer or other machine-readable data storage medium, memory device or other storage or communication device for storage or communication of information, currently known or which becomes available in the future, including, but not limited to, a memory integrated circuit ("IC"), or memory portion of an integrated circuit (such as the resident memory within a controller 130 or processor IC), whether volatile or non-volatile, whether removable or non-removable, including without limitation RAM, FLASH, DRAM, SDRAM, SRAM, MRAM, FeRAM, ROM, EPROM or EPROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. In addition, such computer readable media includes any form of tangible communication media which embodies computer readable instructions, data structures, program modules or other data. The memory 395 may be adapted to store various look up tables, parameters, coefficients, other information and data, programs or instructions (of the software of the present invention), and other types of tables such as database tables.

As indicated above, the controller or processor may be programmed, using software and data structures of the invention, for example, to perform the methodology of the present invention. As a consequence, the system and method of the present invention may be embodied as software which provides such programming or other instructions, such as a set of instructions and/or metadata embodied within a tangible, computer or other machine-readable medium, discussed above. In addition, metadata may also be utilized to define the various data structures of a look up table or a database. Such software may be in the form of source or object code, by way of example and without limitation. Source code further may be compiled into some form of instructions or object code (including assembly language instructions or configuration information). The software, source code or metadata of the present invention may be embodied as any type of code, such as C, C++, SystemC, LISA, XML, Ruby, Perl, PHP, Java, Brew, SQL and its variations (e.g., SQL 99 or proprietary versions of SQL), DB2, Oracle, or any other type of programming or scripting language which performs the functionality discussed herein, including various hardware definition or hardware modeling languages (e.g., Verilog, VHDL, RTL) and resulting database files (e.g., GDSII). As a consequence, a "construct", "program construct", "software construct" or "software", as used equivalently herein, means and refers to any programming language, of any kind, with any syntax or signatures, which provides or can be interpreted to provide the associated functionality or methodology specified (when instantiated or loaded into a processor or computer and executed, including the c controller 130, for example).

The software, metadata, or other source code of the present invention and any resulting bit file (object code, database, or look up table) may be embodied within any tangible storage medium, such as any of the computer or other machine-readable data storage media, as computer-readable instructions, data structures, program modules or other data, such as discussed above with respect to the memory 395, e.g., a floppy disk, a CDROM, a CD-RW, a DVD, a magnetic hard drive, an optical drive, or any other type of data storage apparatus or medium, as mentioned above.

FIG. 15 is a flow chart illustrating an exemplary method in accordance with the teachings of the present invention, and provides a useful summary. Beginning with start step 500, the method generates a first primary voltage having a first primary polarity (and a magnetic flux) in a primary inductor 125, step 505. The magnetic flux is received by a secondary inductor 105, which in turn generates a first secondary voltage having a first secondary polarity, step 510. Depending upon the relative or comparative orientation of the turns comprising the primary inductor 125 and the secondary inductor 105, the first primary polarity and the first secondary polarity may have the same polarity or opposite polarities. Similarly, the magnitudes of the first primary and secondary voltages depend upon the comparative or relative number of turns in the primary inductor 125 and the secondary inductor 105, inductor sizing, switching on-time duration, etc., as discussed above. The first secondary voltage is applied (directly or indirectly) to an illumination source 110, step 515, preferably without additional modification or shaping in an exemplary embodiment (such as provided by intervening electronic components), which energizes the illumination source 110 to emit light in the visible spectrum, step 520.

The method then generates a second primary voltage having a second primary polarity opposite to the first primary polarity (and generates a corresponding magnetic flux) in the primary inductor 125, step 525. The magnetic flux is received by a secondary inductor 105, which in turn generates a second secondary voltage having a second secondary polarity, step 530, which is also opposite to the first secondary polarity. Again, depending upon the relative or comparative orientation of the turns comprising the primary inductor 125 and the secondary inductor 105, the second primary polarity and the second secondary polarity may have the same polarity or opposite polarities. The second secondary voltage is applied directly to an illumination source 110, step 535, which energizes the illumination source 110 to emit light in the visible spectrum, step 540.

During this process, the method optionally may receive feedback signals, step 545. Using the feedback signals, the method may determine if the switching on-time durations and/or switching frequency should be adjusted, step 550, and if so, the method may adjust the switching on-time durations and/or switching frequency, thereby adjusting the magnitudes of the first and second primary voltages, and indirectly adjusting the magnitudes of the first and second secondary voltages, step 555, which in turn affects the energizing of and brightness produced by the illumination source 110, and also may be utilized to detect the presence or absence of a display object 120, and power on or off the primary inductor 125. When the method is to continue (e.g., the primary inductor 125 or power regulator 140 has not been turned into an off state), step 560, the method returns to step 505 and iterates, repeating steps 505-555, and otherwise the method may end, return step 565.

Those having skill in the electronic arts may also consider steps 510, 515 and 520 to either occur substantially concurrently or to be part of a single step, and may also consider steps 530, 535 and 540 to either occur substantially concurrently or to be part of a single step, depending upon the circuit design of the emitting apparatus 150. For example, because of the direct coupling of the secondary inductor 105A or 105B as illustrated in FIGS. 10 and 11, the generated secondary voltage is automatically applied to and thereby energizes the illumination source 110. These steps may also be separate or occur sequentially in other circuit topologies, however, and the separability, order or combination of these steps should not be regarded as limiting.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment of the present invention and not necessarily in all embodiments, and further, are not necessarily referring to the same embodiment. Furthermore, the particular features, structures, or characteristics of any specific embodiment of the present invention may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", unless explicitly indicated to be a direct coupling without intervening components, means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

Furthermore, any signal arrows in the drawings/Figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A system for energizing an emitting apparatus, the emitting apparatus comprising an illumination source and a first secondary inductor coupled to the illumination source, the system comprising:
   a power regulator magnetically couplable to the emitting apparatus, the power regulator comprising:
   a primary inductor;
   a second, feedback secondary inductor; and
   a controller coupled to the primary inductor and to the second, feedback secondary inductor, the controller adapted to control a voltage or current provided to the primary inductor to generate a primary inductor voltage.

2. The system of claim 1, wherein the power regulator has a circuit configuration selected from the group consisting of: an AC-AC converter configuration; an AC-DC converter configuration; a DC-AC converter configuration; a DC-DC converter configuration; and combinations thereof.

3. The system of claim 1, wherein the power regulator has a circuit configuration selected from the group consisting of: a flyback configuration; a boost configuration; a buck configuration; a buck-boost configuration; a quadratic configuration; a cascaded configuration; a two-stage configuration; a forward configuration; a resonant configuration; and combinations thereof.

4. The system of claim 1, wherein the power regulator further comprises:
   a memory coupled to the controller.

5. The system of claim 4, wherein the memory stores at least one parameter selected from a group consisting of: a pulse duration parameter of an induced voltage or current, a switching frequency parameter, a pulse width parameter, a switch on time duration parameter, a switching sequence parameter, an illumination sequence parameter, and combinations thereof.

6. The system of claim 5, wherein the controller is adapted to determine or modify the at least one parameter using a feedback signal from the second, feedback secondary inductor.

7. The system of claim 5, wherein the power regulator further comprises a plurality of switches or transistors coupled to the primary inductor.

8. The system of claim 7, wherein the controller is adapted to determine or modify the pulse duration parameter of the induced voltage or current or is to determine or modify an on-time duration parameter or a switching frequency parameter of the plurality of switches or transistors.

9. The system of claim 1, wherein the controller is adapted to detect a presence or an absence of the emitting apparatus using a feedback signal from the second, feedback secondary inductor.

10. The system of claim 1, wherein the system is a merchandise display system, further comprising:
    a support structure to support the power regulator within a predetermined proximity to at least one display object, the display object having the emitting apparatus and incorporated merchandise.

11. The system of claim 10, wherein the power regulator is disposed along or within a horizontal member or a rear, vertical member of the support structure, or wherein the power regulator is portable and disposed to be positioned on top of a horizontal surface of a support structure.

12. The system of claim 1, wherein the power regulator is couplable to an AC or DC power source or to an Ethernet connection.

13. A system for illuminating a display object, the system comprising:
    an emitting apparatus comprising an illumination source and a first secondary inductor coupled to the illumination source, the illumination source comprising at least one light emitting diode; and
    a power regulator magnetically couplable to the emitting apparatus, the power regulator having a circuit configuration selected from the group consisting of: a flyback configuration; a boost configuration; a buck configuration; a buck-boost configuration; a quadratic configuration; a cascaded configuration; a two-stage configuration; a forward configuration; a resonant configuration; and combinations thereof; the power regulator comprising:
    a primary inductor;
    a second, feedback secondary inductor; and
    a controller coupled to the primary inductor and to the second, feedback secondary inductor, the controller adapted to control a voltage or current provided to the primary inductor to generate a primary inductor voltage.

14. The system of claim 13, wherein the emitting apparatus further comprises a full-bridge or half-bridge rectifier.

15. The system of claim 13, wherein the emitting apparatus further comprises at least one blocking diode or rectifying diode coupled to the at least one light emitting diode.

16. The system of claim 13, wherein the controller is adapted to detect a presence or an absence of the emitting apparatus using a feedback signal from the second, feedback secondary inductor.

17. The system of claim 13, wherein the system is a merchandise display system, further comprising:
    a support structure to support the power regulator within a predetermined proximity to at least one display object, the display object having the emitting apparatus and incorporated merchandise.

18. The system of claim 13, wherein the power regulator further comprises a plurality of switches or transistors coupled to the primary inductor.

19. The system of claim 18, wherein the controller is adapted to determine or modify an on-time duration or a switching frequency of the plurality of switches or transistors.

20. A system for illuminating a display object, the system comprising:
- an emitting apparatus comprising an illumination source and a first secondary inductor coupled to the illumination source, the illumination source comprising:
  - at least one light emitting diode; and
  - at least one blocking diode or rectifying diode coupled to the at
  - least one light emitting diode;
- a power regulator electromagnetically couplable to the emitting apparatus, the power regulator comprising:
- a primary inductor;
- a plurality of switches or transistors coupled to the primary inductor;
- a second, feedback secondary inductor; and
- a controller coupled to the second, feedback secondary inductor and to the plurality of switches or transistors, the controller adapted to control a voltage or current provided to the primary inductor to generate a primary inductor voltage, and to determine or modify an on-time duration or a switching frequency of the plurality of switches or transistors using a feedback signal from the second, feedback secondary inductor.

* * * * *